(12) United States Patent
Jeong et al.

(10) Patent No.: US 10,317,696 B2
(45) Date of Patent: Jun. 11, 2019

(54) ELECTROMAGNETIC WAVE FOCUSING DEVICE AND OPTICAL APPARATUS INCLUDING THE SAME

(71) Applicant: SAMSUNG ELECTRONICS CO., LTD., Suwon-si (KR)

(72) Inventors: Heejeong Jeong, Suwon-si (KR); Chanwook Baik, Yongin-si (KR); Changwon Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 15/379,662

(22) Filed: Dec. 15, 2016

(65) Prior Publication Data

US 2017/0351111 A1 Dec. 7, 2017

(30) Foreign Application Priority Data

Jun. 3, 2016 (KR) ........................ 10-2016-0069386

(51) Int. Cl.
*G02B 21/00* (2006.01)
*G02B 27/58* (2006.01)
(Continued)

(52) U.S. Cl.
CPC ............... *G02B 27/58* (2013.01); *G02B 3/08* (2013.01); *G02B 5/1876* (2013.01);
(Continued)

(58) Field of Classification Search
CPC ........ G02B 23/243; G02B 9/12; G02B 21/33; G02B 27/58; G02B 5/1876; G02B 3/08;
(Continued)

(56) References Cited

U.S. PATENT DOCUMENTS

| 5,257,132 A * | 10/1993 | Ceglio ................... G02B 5/188 359/565 |
| 7,554,739 B2 * | 6/2009 | Yamazaki .......... G02B 27/0927 359/625 |

(Continued)

FOREIGN PATENT DOCUMENTS

| CN | 202141822 U | 2/2012 |
| CN | 104377452 A | 2/2015 |

OTHER PUBLICATIONS

Amir Arbabi et al., "Dielectric metasurfaces for complete control of phase and polarization with subwavelength spatial resolution and high transmission", Nature Nanotechnology, vol. 10, Published Online: Aug. 31, 2015, pp. 937-943, (8 Pages Total), DOI: 10.1038/NNANO.2015.186.

(Continued)

*Primary Examiner* — William R Alexander
*Assistant Examiner* — Henry A Duong
(74) *Attorney, Agent, or Firm* — Sughrue Mion, PLLC

(57) ABSTRACT

Electromagnetic wave focusing devices and optical apparatuses including the same are provided. An electromagnetic wave focusing device may include a plurality of material members located at different distances from a reference point. The intervals and/or widths of the material members may vary with distance from the reference point. For example, the intervals and/or widths of the material members may increase or decrease with distance from the reference point. The intervals and/or widths of the material members may be controlled to satisfy a spatial coherence condition with the electromagnetic wave.

25 Claims, 27 Drawing Sheets
(6 of 27 Drawing Sheet(s) Filed in Color)

(51) Int. Cl.
G02B 3/08 (2006.01)
G02B 5/18 (2006.01)
G02B 1/02 (2006.01)
G02B 21/02 (2006.01)

(52) U.S. Cl.
CPC ............ *G02B 21/0072* (2013.01); *G02B 1/02* (2013.01); *G02B 5/1809* (2013.01); *G02B 21/02* (2013.01)

(58) Field of Classification Search
CPC .. G02B 21/0072; G02B 5/1809; G02B 21/02; G02B 1/02; G02B 3/0087; G02B 3/14; G02B 21/00; G02B 21/025; G02B 21/04; G11B 7/1374
USPC .......................................................... 359/661
See application file for complete search history.

(56) References Cited

U.S. PATENT DOCUMENTS

| | | |
|---|---|---|
| 2009/0261250 A1 | 10/2009 | Zhou et al. |
| 2013/0058370 A1 | 3/2013 | Chang-Hasnain et al. |
| 2015/0192712 A1* | 7/2015 | Jiang .................... G02B 5/1828 359/565 |
| 2015/0219806 A1 | 8/2015 | Arbabi et al. |
| 2016/0025914 A1 | 1/2016 | Brongersma et al. |
| 2016/0086681 A1 | 3/2016 | Leung et al. |
| 2016/0356956 A1* | 12/2016 | Davoine ............ G01N 21/7743 |
| 2017/0336326 A1* | 11/2017 | Sirat .................. G02B 21/0056 |

OTHER PUBLICATIONS

Shiyi Wang et al., "Generation of vectorial optical fields with slot-antenna-based metasurface", Optics Letters, Optical Society of America, vol. 40, No. 20, Oct. 15, 2015, (pp. 4711-4714, 4 Pages Total).
Wikipedia.,"Refractive index and extinction coefficient of thin film materials", Wikimedia Foundation, Inc., Page was last modified on Nov. 15, 2016, (10 Pages Total) Retrieved from: https://en.wikipedia.org/w/index.php?title=Refractive_index_and_extinction_coefficient_of_thin_film_materials&oldid=749668244.
Amir Arbabi et al., "Subwavelength-thick lenses with high numerical apertures and large efficiency based on high-contrast transmitarrays", Nature Communications, vol. 6, Article No. 7069, (19 Pages Total) Published: May 7, 2015, doi:10.1038/ncomms8069.
J. B. Pendry., "Negative Refraction Makes a Perfect Lens", Physical Review Letters, The American Physical Society, vol. 85, No. 18, Oct. 30, 2000, (pp. 3966-3969, 4 Pages Total).
U. Dürig et al., "Near-field optical-scanning microscopy", IBM Zurich Research Laboratory, 8803 Ruschlikon, Switzerland, American Institute of Physics, Journal of Applied Physics 59(10), May 15, 1986, (pp. 3318-3327, 11 Pages Total), doi: 10.1063/1.336848.
Prashant Prabhat et al., "Semrock White Paper Series: Super-resolution Microscopy", www.Semrock.com, May 2011, (12 Pages Total).
Heejeong Jeong et al., "Slow-light-induced interference with stacked optical precursors for square input pulses", Optics Letters, Optical Society of America, vol. 35, No. 2, Jan. 15, 2010, (pp. 124-126, 3 Pages Total).
Communication dated Aug. 9, 2017, issued by the European Patent Office in counterpart European Application No. 17151764.2.

* cited by examiner

FIG. 21
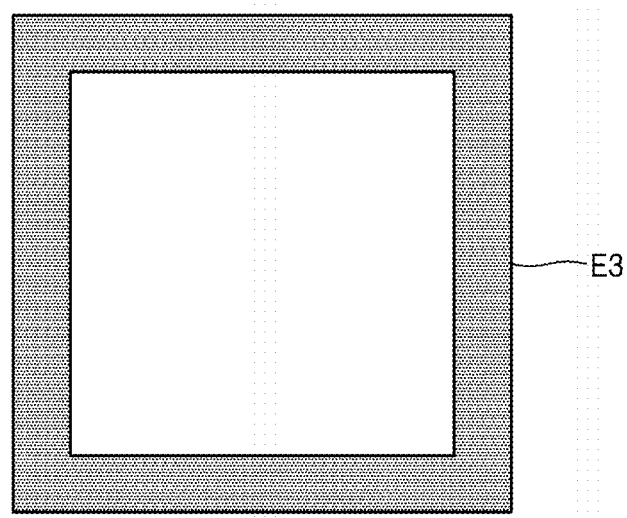
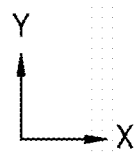

ELECTROMAGNETIC WAVE FOCUSING DEVICE AND OPTICAL APPARATUS INCLUDING THE SAME

CROSS-REFERENCE TO RELATED APPLICATION

This application claims priority from Korean Patent Application No. 10-2016-0069386, filed on Jun. 3, 2016, in the Korean Intellectual Property Office, the disclosure of which is incorporated herein in its entirety by reference.

BACKGROUND

1. Field

Apparatuses consistent with exemplary embodiments relate to optical structures and apparatuses including the same, and more particularly, to electromagnetic wave focusing devices and optical apparatuses including the same.

2. Description of the Related Art

As nano device technology has developed, various options for manufacturing thin film type/ultra-compact type optical elements and optical devices have been developed. Also, interest has increased in technologies that promise a high resolving power beyond the resolution limit of existing optical systems. High resolving power technology may have a ripple effect on many fields requiring high-resolution imaging, such as biotechnology and analysis technology. In particular, a non-fluorescent type "true" super-resolution technology is desired, as compared to a "functional" super-resolution technology using fluorescent materials.

In the case of a Faraon type metasurface, lens performance is implemented by arranging numerous amorphous silicon (a-Si) nanoposts on a substrate. However, since absorption coefficients of nanoposts are large in the visible light region, it is difficult to use nanoposts in the visible light region. Also, since nanoposts having smaller sizes are necessary for use in wavelength regions, the processing difficulty is increased.

In the case of a Pendry superlens, an image is formed in a point area by using a metamaterial having a negative (−) refractive index regardless of a diffraction limit. However, a complicated and difficult process is needed for manufacturing a Pendry superlens. Also, it is almost impossible to manufacture a metamaterial having a negative refractive index in various visible light wavelength regions, and there is a fundamental limitation such as light loss by metal.

In the case of near-field scanning optical microscopy (NSOM), although resolution may be increased by using a near field of a metal tip, it is required that a distance between the metal tip and a sample is shorter than a wavelength. Accordingly, there is the difficulty that a user is required to have high-level proficient technique, expensive equipment is necessary, and coupling efficiency is low.

In order for common users/customers to use products with high resolving power/super-resolution imaging technology, various requirements, such as, mass producibility, price competitiveness, miniaturization, user-friendly user interface (UI), etc., may be desired.

SUMMARY

One or more exemplary embodiments provide electromagnetic wave focusing devices having superior performance.

One or more exemplary embodiments provide electromagnetic wave focusing devices which may implement a high resolving power/super-resolution.

One or more exemplary embodiments provide electromagnetic wave focusing devices having a small thickness and which are easy to manufacture.

One or more exemplary embodiments provide electromagnetic wave focusing devices having simple structures.

One or more exemplary embodiments provide optical apparatuses including the electromagnetic wave focusing device. For example, a microscope (super-resolution microscope) employing the electromagnetic wave focusing device may be provided by one or more exemplary embodiments.

Additional exemplary aspects and advantages will be set forth in part in the description which follows and, in part, will be apparent from the description, or may be learned by practice of the presented exemplary embodiments.

According to an aspect of an exemplary embodiment, an electromagnetic wave focusing device includes a plurality of material members, each at least partially surrounding a reference point and located at a distance from the reference point different from distances at which all other of the plurality of material members are located. In other words, the plurality of material members may be arranged substantially concentrically around the reference point. The plurality of members are arranged at non-uniform (non-periodic) intervals with respect to each other and are configured to focus electromagnetic waves at a point in space, the electromagnetic waves being focused after passing through the plurality of material members.

The plurality of material members may define a first interval between a first pair of two adjacent material members, a second interval between a second pair of two adjacent material members, such that the second interval is different from the first interval. Optionally, a third interval is defined between a third pair of two adjacent material members, where the third interval is different from the first and second intervals.

Intervals between the plurality of material members may increase with distance from the reference point.

Intervals between the plurality of material members may decrease with distance from the reference point.

When a width of each of the material members is defined as a distance between an inner circumference and an outer circumference thereof, at least two of the plurality of material members may have different widths from each other.

Widths of the plurality of material members may increase or decrease with distance from the reference point.

Widths and intervals of the plurality of material members sequentially may increase or decrease with distance from the reference point.

Each of the plurality of material members may have a ring structure.

Each of the plurality of material members may include any one of dielectric and semiconductor.

Each of the plurality of material members may include any one of Si, Ge, GaP, SiOx, SiNx, and an oxide semiconductor, and the oxide semiconductor may include at least one of Zn, In, Ga, and Sn.

At least two of the plurality of material members may have different thicknesses from each other.

The plurality of material members may include first and second material members, at least one of the first and second material members may have a multilayer structure, and the number of material layers constituting the first material member and the number of material layers constituting the second material member may be different from each other.

Thicknesses of the plurality of material members may range from several tens of nanometers (nm) to several micrometers (μm).

An entire width of the plurality of material members may range from about 0.5 μm to about 50 μm.

A numerical aperture (NA) of the electromagnetic wave focusing device may be equal to or greater than 0.3.

The electromagnetic wave focusing device may be configured to output an output light having a full width at half maximum (FWHM) that is less than ½ of a wavelength of an incident light.

The electromagnetic wave focusing device may further include a transparent substrate, in which the plurality of material members are provided on a surface of the transparent substrate.

According to an aspect of another exemplary embodiment, a optical apparatus includes the electromagnetic wave focusing device including a plurality of material members, each at least partially surrounding a reference point and located at a distance from the reference point different from distances at which all other of the plurality of material members are located. In other words, the plurality of material members may be arranged substantially concentrically around the reference point. The plurality of material members may be arranged at irregular intervals with respect to each other and are configured to focus electromagnetic waves at a point in space, the electromagnetic waves being focused after passing through the plurality of material members.

According to an aspect of another exemplary embodiment, a electromagnetic wave focusing device for focusing electromagnetic waves at a point in space, the electromagnetic wave focusing device including a plurality of material members, each at least partially surrounding a reference point and located at a distance from the reference point different from distances at which all other of the plurality of material members are located. In other words, the plurality of material members may be arranged substantially concentrically around the reference point. The plurality of members are arranged at intervals which are determined to satisfy spatial coherence with the electromagnetic waves with distance from the reference point, and each of the widths is defined as a distance between an outer side and an inner side of each of the plurality of material component.

The intervals and widths of the plurality of material members may increase with distance from the reference point.

The intervals and widths of the plurality of material members may decrease with distance from the reference point.

An optical apparatus including the electromagnetic wave focusing device that includes a plurality of material members, each at least partially surrounding a reference point and located at a distance from the reference point different from distances at which all other of the plurality of material members are located. In other words, the plurality of material members may be arranged substantially concentrically around the reference point. The plurality of members are arranged at intervals and with widths which are defined to satisfy spatial coherence with the electromagnetic waves with distance from the reference point, and each of the widths is defined as a distance between an outer circumference and an inner circumference of each of the plurality of material component.

According to an aspect of another exemplary embodiment, a microscope includes an objective lens unit arranged facing an object to be observed, the objective lens unit including the electromagnetic wave focusing device that includes a plurality of material members, each at least partially surrounding a reference point and located at a distance from the reference point different from distances at which all other of the plurality of material members are located. The plurality of material members may be arranged at irregular intervals with respect to each other and may be configured to focus electromagnetic waves at a point in space, the electromagnetic waves being focused after passing through the plurality of material members, an electromagnetic wave source unit irradiating electromagnetic waves toward the objective lens unit, and an image providing unit showing an image of the object obtained through the objective lens unit.

The microscope may have a resolving power that is less than ½ of a wavelength of the electromagnetic waves incident upon the electromagnetic wave focusing device.

The microscope may be configured to obtain an image of the object by scanning the object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other exemplary aspects and advantages will become apparent and more readily appreciated from the following description of the exemplary embodiments, taken in conjunction with the accompanying drawings in which:

FIG. 21 is a plan view for explaining an electromagnetic wave focusing device according to another exemplary embodiment;

DETAILED DESCRIPTION

Figure 1:
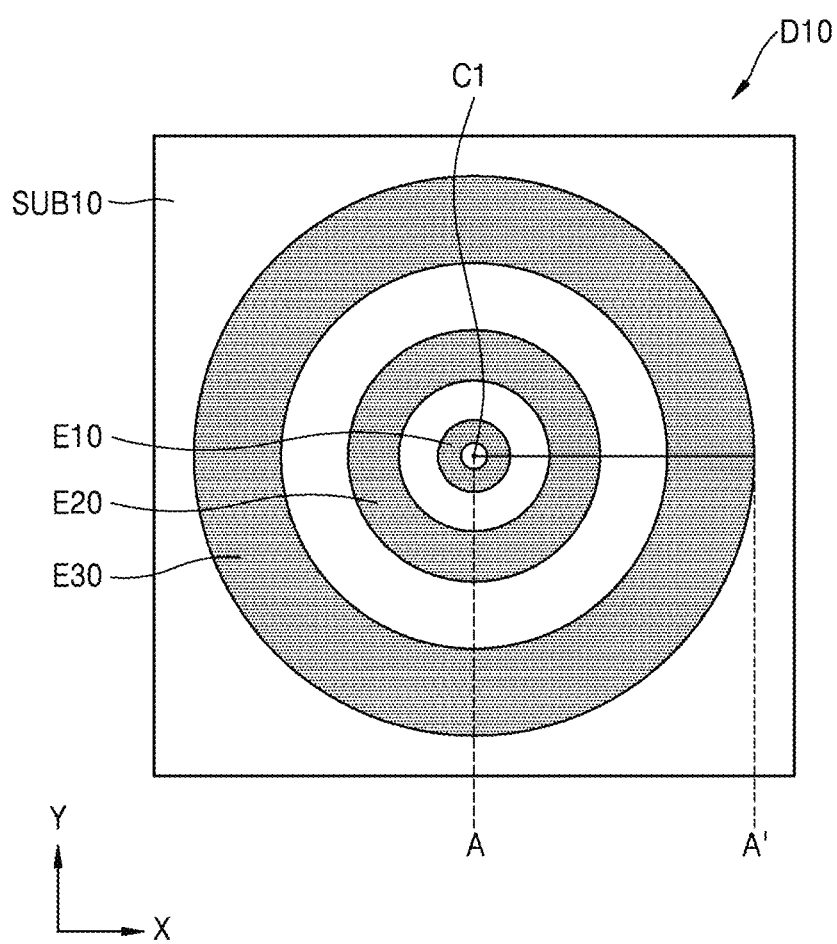
FIG. 1 is a plan view of an electromagnetic wave focusing device according to an exemplary embodiment.

Various exemplary embodiments will now be described more fully with reference to the accompanying drawings in which exemplary embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Reference will now be made in detail to electromagnetic wave focusing devices and optical apparatuses including the electromagnetic wave focusing devices according to exemplary embodiments which are illustrated in the accompanying drawings. In the drawings, the width and thicknesses of layers and regions are exaggerated for clarity of the specification and for convenience of explanation. Like reference numerals refer to like elements throughout.

FIG. 1 is a plan view of an electromagnetic wave focusing device D10 according to an exemplary embodiment.

Referring to FIG. 1, the electromagnetic wave focusing device D10 may include a plurality of material members (i.e., elements or components) E10, E20, and E30, together forming a structure encompassing a reference point C1 on a plane. The material members E10, E20, and E30 may be located at difference distances from the reference point C1. The material members E10, E20, and E30 may include, for example, a first material member E10, a second material member E20, and a third material member E30. The first, second, and third material members E10, E20, and E30 may be sequentially arranged in increasing distance from the reference point C1. The material members E10, E20, and E30 may have a coaxial ring structure in which each of the material members has a different size. Although three material members E10, E20, and E30 are used in the present exemplary embodiment, it is merely exemplary and four or more material members may be used.

The material members E10, E20, and E30 may be arranged at non-uniform intervals (i.e., non-periodic intervals or irregular intervals). In other words, the interval between the first material member E10 and the second material member E20 and the interval between the second material member E20 and the third material member E30 may be different from each other. Also, at least two of the material members E10, E20, and E30 may have different widths. The width of each of the material members E10, E20, and E30 may be defined to be a distance between an outermost side or circumference and an innermost side or circumference of the material members E10, E20, and E30, respectively. All of the material members E10, E20, and E30 may have different widths. Accordingly, the intervals and widths of the material members E10, E20, and E30 may vary in their distance from the reference point C1. The material members E10, E20, and E30 may have intervals and widths determined to satisfy spatial coherence with electromagnetic waves (not shown) to be incident thereon.

The intervals between the material members E10, E20, and E30 may increase with distance of the material member from the reference point C1. The widths of the material members E10, E20, and E30 may increase with distance from the reference point C1. When the intervals of the material members E10, E20, and E30 increase with distance from the reference point C1, the widths of the material members E10, E20, and E30 may also increase with distance from the reference point C1. In this case, the intervals and widths of the material members E10, E20, and E30 may sequentially (continuously) increase with distance from the reference point C1. According to another exemplary embodiment, the intervals of the material members E10, E20, and E30 may decrease with distance from the reference point C1. The widths of the material members E10, E20, and E30 may decrease with distance from the reference point C1. When the intervals of the material members E10, E20, and E30 decrease with distance from the reference point C1, the widths of the material members E10, E20, and E30 may also decrease with distance from the reference point C1. In this case, the intervals and widths of the material members E10, E20, and E30 may sequentially (continuously) decrease with distance from the reference point C1.

The material members E10, E20, and E30 may be arranged on one single surface of a substrate SUB10. The substrate SUB10 may be a transparent substrate formed of a transparent material, for example, quartz or glass. The material of the substrate SUB10 is not limited to quartz or glass and any of variety of materials may be employed therefor.

Figure 2:
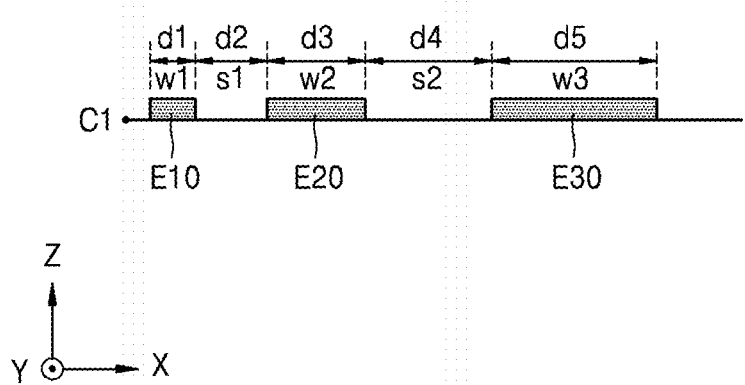
FIG. 2 is a cross-sectional view taken along a line A-A' of a plurality of material members of FIG. 1.

FIG. 2 is a cross-sectional view taken along a line A-A' of the material members E10, E20, and E30 of FIG. 1.

Referring to FIG. 2, a width w1 of the first material member E10, a width w2 of the second material member E20, and a width w3 of the third material member E30 may be different from one another. For example, it may be that w1<w2<w3. An interval s1 between the first material member E10 and the second material member E20 and an interval s2 between the second material member E20 and the third material member E30 may be different from each other. For example, it may be that s1<s2. When the w1, s1, w2, s2, and w3 are respectively represented by d1, d2, d3, d4, and d5, it may be that d1<d2<d3<d4<d5. This shows that the widths and intervals of the material members E10, E20, and E30 gradually increase with distance from the reference point C1. In this case, while maintaining a ratio of d1, d2, d3, d4, and d5, the size of each of d1, d2, d3, d4, d5 may be modified. For example, the size of each of d1, d2, d3, d4, and d5 may be changed to ½ times, 2 times, 3 times or the like. In FIG. 2, although d1, d2, d3, d4, and d5 sequentially increase with distance from the reference point C1, this is merely exemplary and a size relation between d1, d2, d3, d4, and d5 may be variously changed.

In the exemplary embodiment of FIGS. 1 and 2, the material members E10, E20, and E30 may be composed of a dielectric material or a semiconductor material. For example, the material members E10, E20, and E30 may include any one of Si, Ge, GaP, SiOx, SiNx, and semiconductor oxide. The semiconductor oxide may include at least one of Zn, In, Ga, and Sn. The semiconductor oxide may include, for example, ZnO, InSnO, GaInZnO, and HfInZnO. The Si may be amorphous silicon (a-Si) or polycrystalline silicon (poly-Si). The SiOx may be, for example, $SiO_2$, and the SiNx may be, for example, $Si_3N_4$. When the material members E10, E20, and E30 are formed of Si, e.g., a-Si, the material members E10, E20, and E30 may be formed by using an existing Si-based semiconductor process. Accordingly, the material members E10, E20, and E30 may be formed at relatively low costs. However, the material of the material members E10, E20, and E30 is not limited thereto and various materials may be employed therefor. For example, the material members E10, E20, and E30 may include any one selected from a group consisting of AlGaAs, GaAs, AlAs, InGaAlAs, AlGaInAs, and InP.

The thicknesses of the material members E10, E20, and E30 may be about several tens of nanometers (nm) to about several micrometers (μm). For example, the thicknesses of the material members E10, E20, and E30 may be about 50 nm to about 2 μm, or about 100 nm to about 1 μm. The thicknesses of the material members E10, E20, and E30 may be less than the wavelength of electromagnetic waves (incident light) determined to be incident upon the electromagnetic wave focusing device D10.

The entire width (outermost diameter) of the material members E10, E20, and E30 may be about several hundred nanometers to about several tens of micrometers. For example, the entire width (outermost diameter) of the material members E10, E20, and E30 may be about 0.5 μm to about 50 μm, or about 1 μm to about 10 μm. As such, the electromagnetic wave focusing device D10 having superior properties may be implemented by using a combination of simple patterns in a small size within about 10 μm.

Also, the distance (unit width) between the outermost side or circumference and the innermost side or circumference of each of the material members E10, E20, and E30 may be equal to or greater than about 50 nm or equal to or greater than about 100 nm. The intervals between the material members E10, E20, and E30 may be equal to or greater than about 50 nm or equal to or greater than about 100 nm. As such, the unit width of each of the material members E10, E20, and E30 and the intervals between the material members E10, E20, and E30 are relatively large, the material members E10, E20, and E30 may be easily formed (patterned) without processing difficulties.

Figure 3:
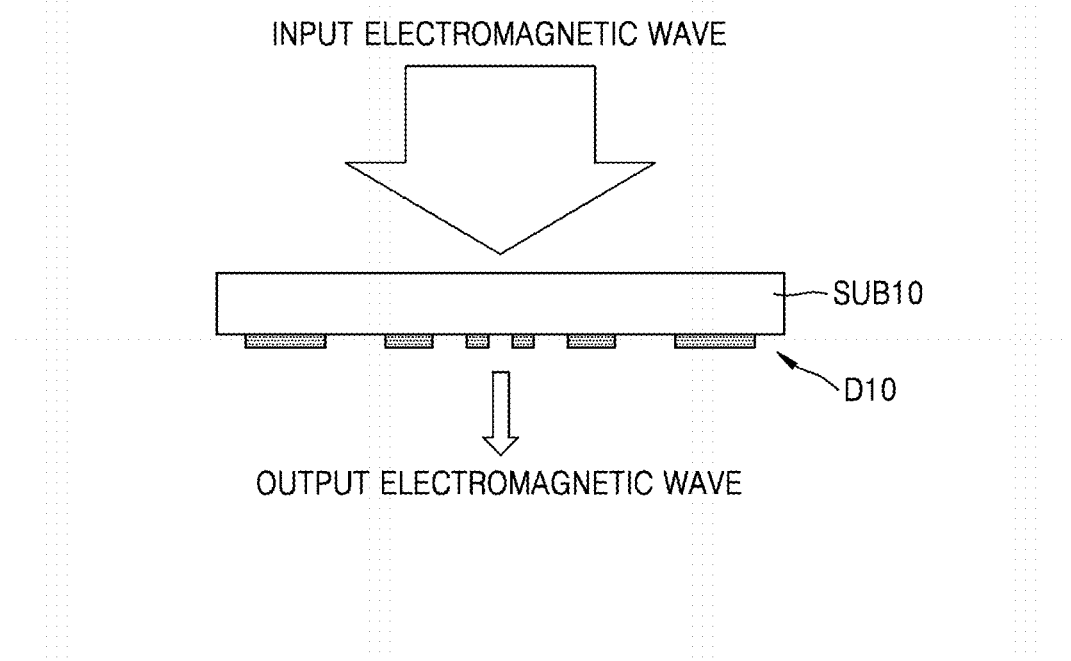
FIG. 3 is a cross-sectional view conceptually illustrating focusing of electromagnetic waves by an electromagnetic wave focusing device according to an exemplary embodiment.

FIG. 3 is a cross-sectional view conceptually illustrating focusing of electromagnetic waves by the electromagnetic wave focusing device D10 according to an exemplary embodiment.

Referring to FIG. 3, electromagnetic waves input from one side of the electromagnetic wave focusing device D10 may be focused by the electromagnetic wave focusing device D10 and output to the other side of the electromagnetic wave focusing device D10. In this state, the electromagnetic wave focusing device D10 may be provided on a lower surface of the substrate SUB10, and the electromagnetic waves incident on an upper surface of the substrate SUB10 may be output toward the lower surface of the substrate SUB10.

The electromagnetic wave focusing device D10 according to an exemplary embodiment may be a "flat plate-type optical device (flat optics)". Since the electromagnetic wave focusing device D10 focuses light, the electromagnetic wave focusing device D10 may be function as a "lens", and may be referred to as a "thin flat lens" when considering the shape and size of the electromagnetic wave focusing device D10. When the electromagnetic wave focusing device D10 is formed of silicon (Si), the electromagnetic wave focusing device D10 may be a "silicon-based thin lens". Also, the electromagnetic wave focusing device D10 may have a small thickness of a subwavelength and implement electromagnetic properties by using a plurality of artificial material patterns. Accordingly, from this point of view, the electromagnetic wave focusing device D10 may be referred to as a "metasurface structure". Also, when the material patterns, that is, the material members of FIG. 1, are formed of dielectric or semiconductor materials, the electromagnetic wave focusing device D10 may be referred to as a "dielectric metasurface structure" or "semiconductor metasurface structure," respectively. The electromagnetic wave focusing device D10 may be a "non-metallic metasurface structure" in which no metal is included. Also, the electromagnetic wave focusing device D10 may be referred to as a "passive meta-lens" having a simple structure.

Figure 4:
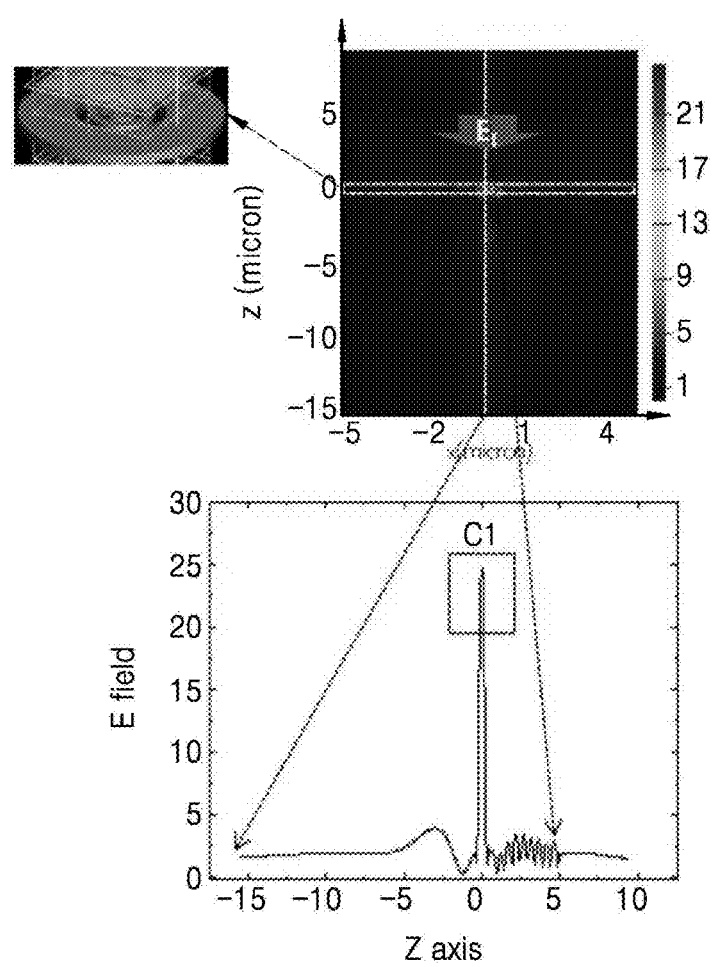
FIG. 4 is a graph showing intensities of electromagnetic waves by positions in a direction in which electromagnetic waves are input, when the electromagnetic waves are incident upon the electromagnetic wave focusing device according to an exemplary embodiment.

FIG. 4 is a graph showing intensities of electromagnetic waves (E field) by positions in a direction in which electromagnetic waves are input, when the electromagnetic waves are incident upon the electromagnetic wave focusing device according to an exemplary embodiment. A wavelength of the incident electromagnetic waves $E_1$ is about 868 nm.

Referring to FIG. 4, it may be seen that, when the electromagnetic waves $E_1$ having a intensity of "1" are incident upon the electromagnetic wave focusing device D10, the electromagnetic waves $E_1$ may have a intensity equivalent to about "24" at a position corresponding to the reference point C1 of the electromagnetic wave focusing device D10. In other words, the electromagnetic waves $E_1$ having an intensity of "1" are reinforced to be the electromagnetic waves have an intensity corresponding to about "24". Accordingly, it may be seen that the electromagnetic waves $E_1$ are focused/reinforced by the electromagnetic wave focusing device D10 according to an exemplary embodiment.

Figure 5:
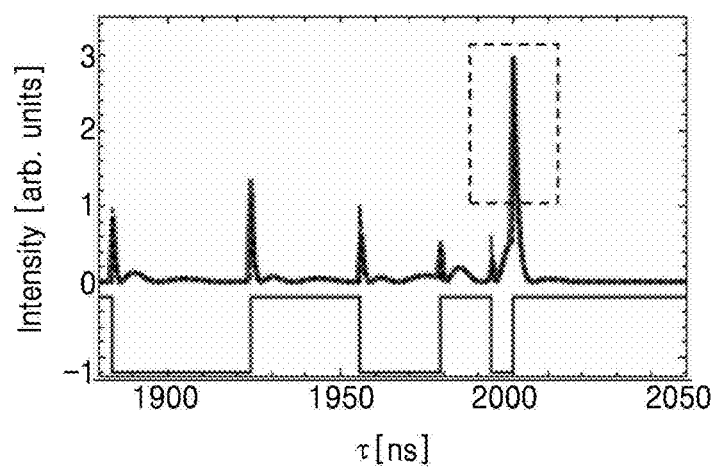
FIG. 5 is a graph showing intensities of electromagnetic waves output through a medium when a series of electromagnetic wave pulses are irradiated onto the medium to satisfy a coherence condition, thereby explaining a principle to be applied to the electromagnetic wave focusing device according to an exemplary embodiment.

FIG. 5 is a graph showing intensities of electromagnetic waves output through a medium when a series of electromagnetic wave pulses, which is an on-off series of electromagnetic waved according to time, are irradiated onto the medium to satisfy a coherence condition, thereby explaining a principle applicable to the electromagnetic wave focusing device according to an exemplary embodiment.

Referring to FIG. 5, it may be seen that electromagnetic waves having a relatively large intensity are output in a region in which input electromagnetic wave pulses are modulated, that is, in a transient region. Also, it may be seen that, when a coherence condition of an on-off series is satisfied, electromagnetic waves having a very large intensities are output at a particular time point (dotted area). This shows that when the time pulse of the input electromagnetic waves satisfies the coherence condition with respect to the medium, electromagnetic waves of very large intensities are output at a particular time point.

The electromagnetic wave focusing device D10 described with reference to FIG. 1 to FIG. 3 may be implemented by appropriately spatially mapping the coherence condition of the time pulse of FIG. 5. The electromagnetic waves having very large intensities may be output at the reference point C1 or in an area adjacent thereto, as illustrated in FIG. 4, by using the electromagnetic wave focusing device D10.

Figure 6:
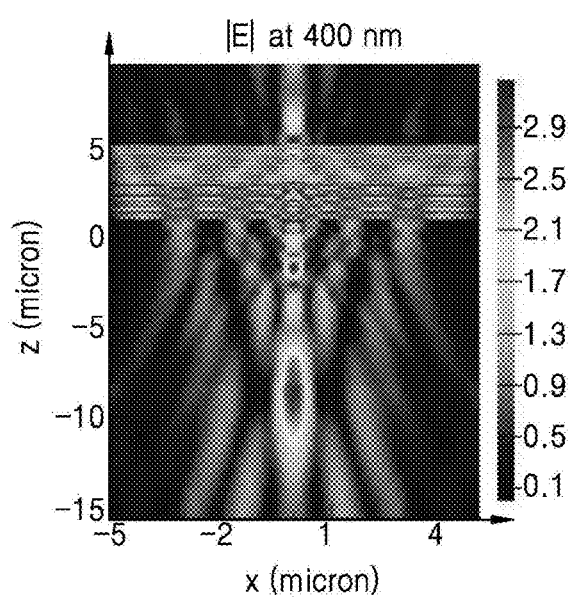
FIGS. 6 to 8 are graphs showing results of evaluating a beam focusing effect for each wavelength of electromagnetic waves (incident light) perpendicularly incident on an electromagnetic wave focusing device according to an exemplary embodiment, by using a finite-difference time-domain (FDTD) simulation method.
Figure 7:
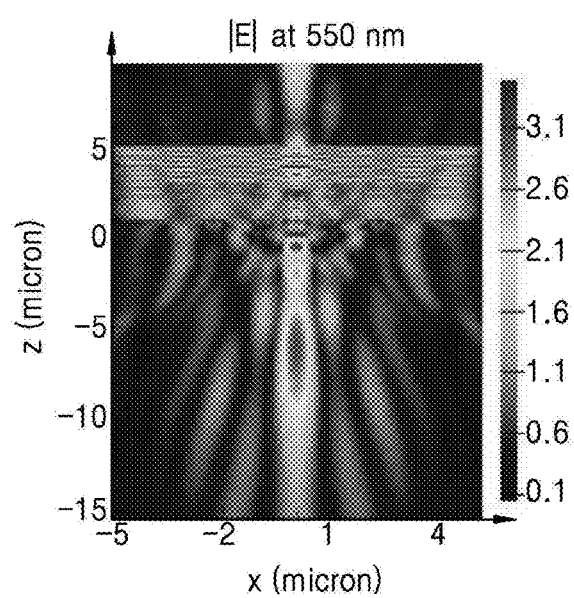
Figure 8:
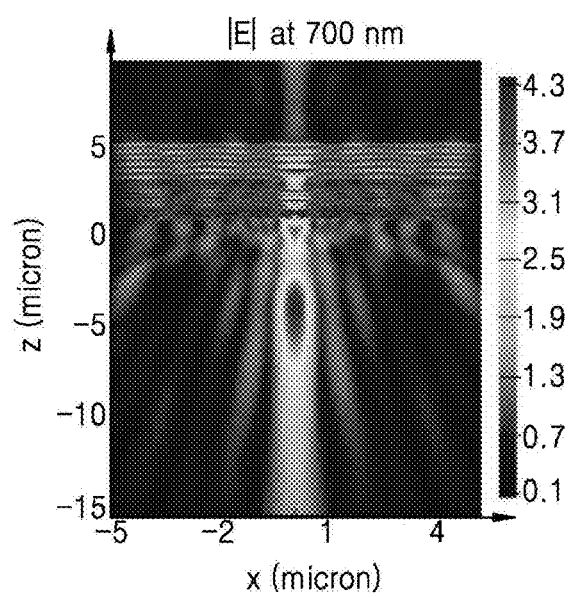

FIGS. 6 to 8 are graphs showing results of evaluating a beam focusing effect for each wavelength of electromagnetic waves (incident light) perpendicularly incident on an electromagnetic wave focusing device according to an exemplary embodiment, by using a finite-difference time-domain (FDTD) simulation method. FIG. 6 illustrates a case in which the wavelength of the incident electromagnetic waves is about 400 nm (blue); FIG. 7 illustrates a case in which the wavelength of the incident electromagnetic waves is about 550 nm (green); and FIG. 8 illustrates a case in which the wavelength of the incident electromagnetic waves is about 700 nm (red). The electromagnetic wave focusing device used in FIGS. 6 to 8 has the structure described with respect to FIGS. 1 and 2. In this case, d1, d2, d3, d4, and d5 were respectively about 0.24 μm, about 0.37 μm, about 0.5 μm, about 0.64 μm, and about 0.77 μm. Also, a distance from the reference point (center point) C1 to a first material member (ring pattern) E10 was about 0.1 μm. Additionally, a dummy pattern is further provided outside the third material member E30 and separated therefrom. In this case, the interval between the third material member E30 and the dummy pattern was about 0.91 μm. The material members (ring pattern) E10, E20, and E30 are all formed of a-Si, and the thicknesses of the material members E10, E20, and E30 were about 100 nm.

Referring to FIGS. 6 to 8, it may be seen that, even when the wavelength of the incident electromagnetic waves is changed within a region of visible light (400-700 nm), a focusing effect of a beam at one point in each wavelength region is obtained. It seems that, even when an absorption coefficient with respect to visible light is high by using a-Si, an effect of focusing the electromagnetic waves at one point is obtained because not only the high refractive index properties of a-Si are used, but also the spatial coherence effect, that is, a light-matter coherent interaction effect, is used. Also, when the electromagnetic wave focusing device is applied to a lens unit, the numerical aperture (NA) of the electromagnetic wave focusing device may be equal to or greater than about 0.3. For example, the NA of the electromagnetic wave focusing device may be about 0.3-0.8. Also, it is expected that, even when the electromagnetic waves are incident upon the focusing apparatus in a non-perpendicular direction, an effect of focusing electromagnetic waves at various wavelengths may be obtained through design change and design optimization.

Figure 9:
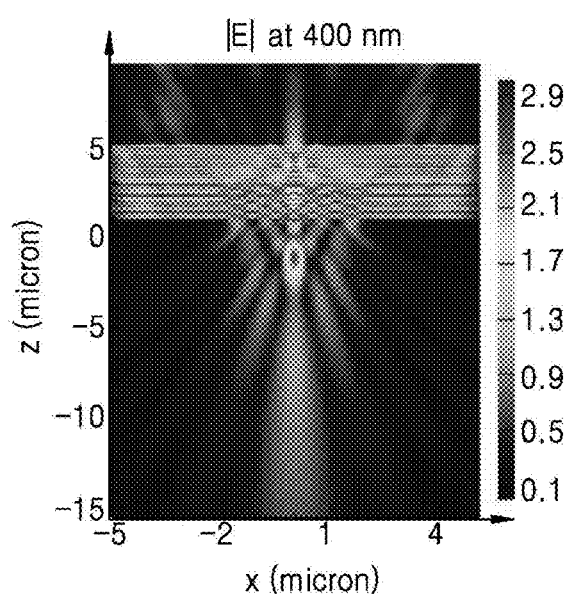
FIG. 9 is a graph showing a result of evaluating a beam focusing effect of electromagnetic waves (incident light) perpendicularly incident on an electromagnetic wave focusing device according to another exemplary embodiment, by using the FDTD simulation method.

FIG. 9 is a graph showing a result of evaluating a beam focusing effect of electromagnetic waves (incident light) perpendicularly incident on an electromagnetic wave focusing device according to another exemplary embodiment, by using the FDTD simulation method. The electromagnetic wave focusing device used in FIG. 9 has the structure described with respect to FIGS. 1 and 2, and the widths and intervals of the material members E10, E20, and E30, that is, d1, d2, d3, d4, and d5, may be half (½) of the values described with reference to FIGS. 6 to 8. The thicknesses of the material members E10, E20, and E30 are about 100 nm, and the wavelength of the incident electromagnetic waves is about 400 nm.

Referring to FIG. 9, it may be seen that a beam focusing effect, that is, beams are focused at one point is obtained.

Figure 10:
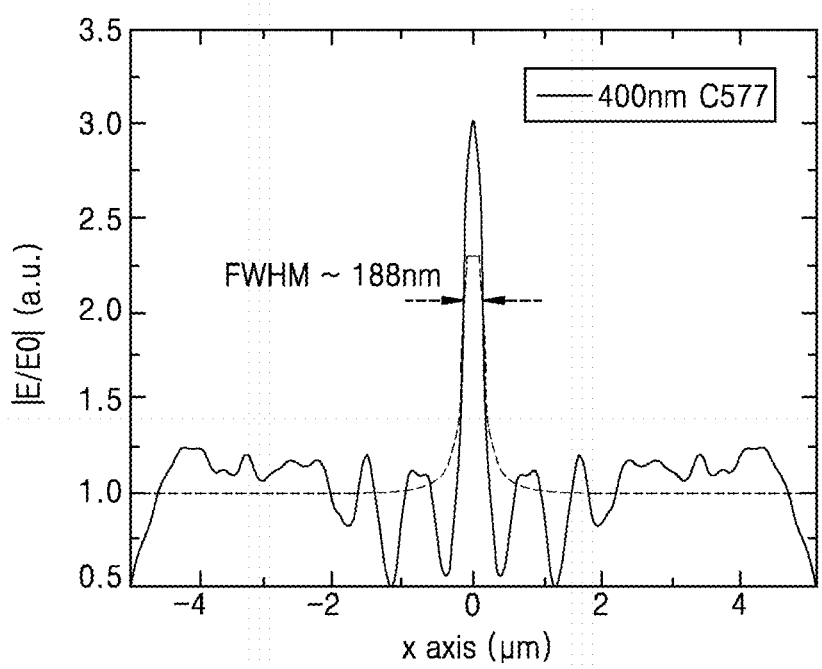
FIG. 10 is a graph explaining a full width at half maximum (FWHM) of the focused beam (electromagnetic wave) of FIG. 9.

FIG. 10 is a graph for explaining a full width at half maximum (FWHM) of the focused beam (electromagnetic wave) of FIG. 9. In FIG. 10, the X-axis denotes a position in an X-axis direction and the Y-axis denotes an absolute value, that is, |E/E0|, of the intensity ratio of output electromagnetic waves E to the incident electromagnetic waves E0.

Referring to FIG. 10, it may be seen that the FWHM of a focused beam (electromagnetic waves) is about 188 nm. Since the wavelength of the incident electromagnetic waves is about 400 nm, the FWHM (188 nm) of the focused beam (electromagnetic waves) is less than half of the wavelength (400 nm) of the incident electromagnetic waves. It may be seen from the above result that a high resolving power equal to or less than a subwavelength is obtained by using the electromagnetic wave focusing device according to an exemplary embodiment. It may be seen that, considering that the resolving power limit of a conventional optical system is about 250 nm or about 200 nm, a high resolving power/super-resolution over the resolving power limit of a general optical system is obtained by using the electromagnetic wave focusing device according to an exemplary embodiment. When the electromagnetic wave focusing device is applied to an optical apparatus, for example, a lens unit of a microscope, a high resolving power/super-resolution microscope may be obtained.

Figure 11:
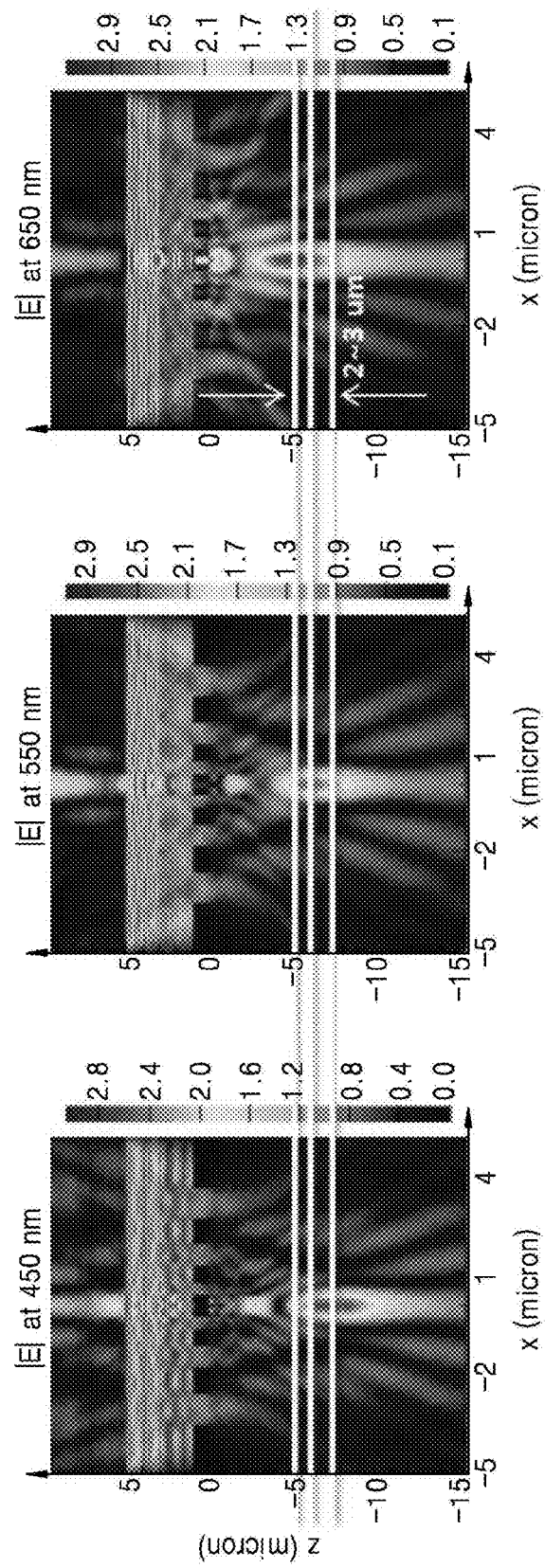
FIGS. 11A, 11B, and 11C are graphs showing results of evaluating a beam focusing effect of electromagnetic waves (incident light) perpendicularly incident on an electromagnetic wave focusing device according to another exemplary embodiment, by using the FDTD simulation method.

FIGS. 11A, 11B, and 11C are graphs showing results of evaluating a beam focusing effect of electromagnetic waves (incident light) perpendicularly incident on an electromagnetic wave focusing device according to another exemplary embodiment, by using the FDTD simulation method. FIG. 11A illustrates a case in which the wavelength of the incident electromagnetic waves is about 450 nm. FIG. 11B illustrates a case in which the wavelength of the incident electromagnetic waves is about 550 nm. FIG. 11C illustrates a case in which the wavelength of the incident electromagnetic waves is about 650 nm. The structure of the electromagnetic wave focusing device used in FIG. 11 is the same as that of the electromagnetic wave focusing device described with reference to FIGS. 6 to 8, except that the thickness of material members is about 940 nm. In this case, it is evaluated how the beam focusing properties are changed according to a change in the thickness of material members forming the electromagnetic wave focusing device.

Referring to FIGS. 11A, 11B, and 11C, it may be seen that, even when the wavelength of the incident electromagnetic waves is changed within a visible light region, superior beam focusing effect is obtained. Also, it may be seen that a difference in the beams focusing position (height) between FIG. 11A, FIG. 11B, and FIG. 11C is as small as about 2 to 3 µm. This means that, even if the wavelength (color) of the incident electromagnetic waves is changed, the position of a focused beam is not changed much. In other words, it means that chromatic aberration decreases. The chromatic aberration of the electromagnetic wave focusing device according to an exemplary embodiment may be within about 5 µm or 3 µm. Accordingly, it may be seen that the properties and efficiency of the electromagnetic wave focusing device may be improved through the change/control of designs and dimensions of material members forming the electromagnetic wave focusing device, by utilizing the present inventive concept.

Figure 12:
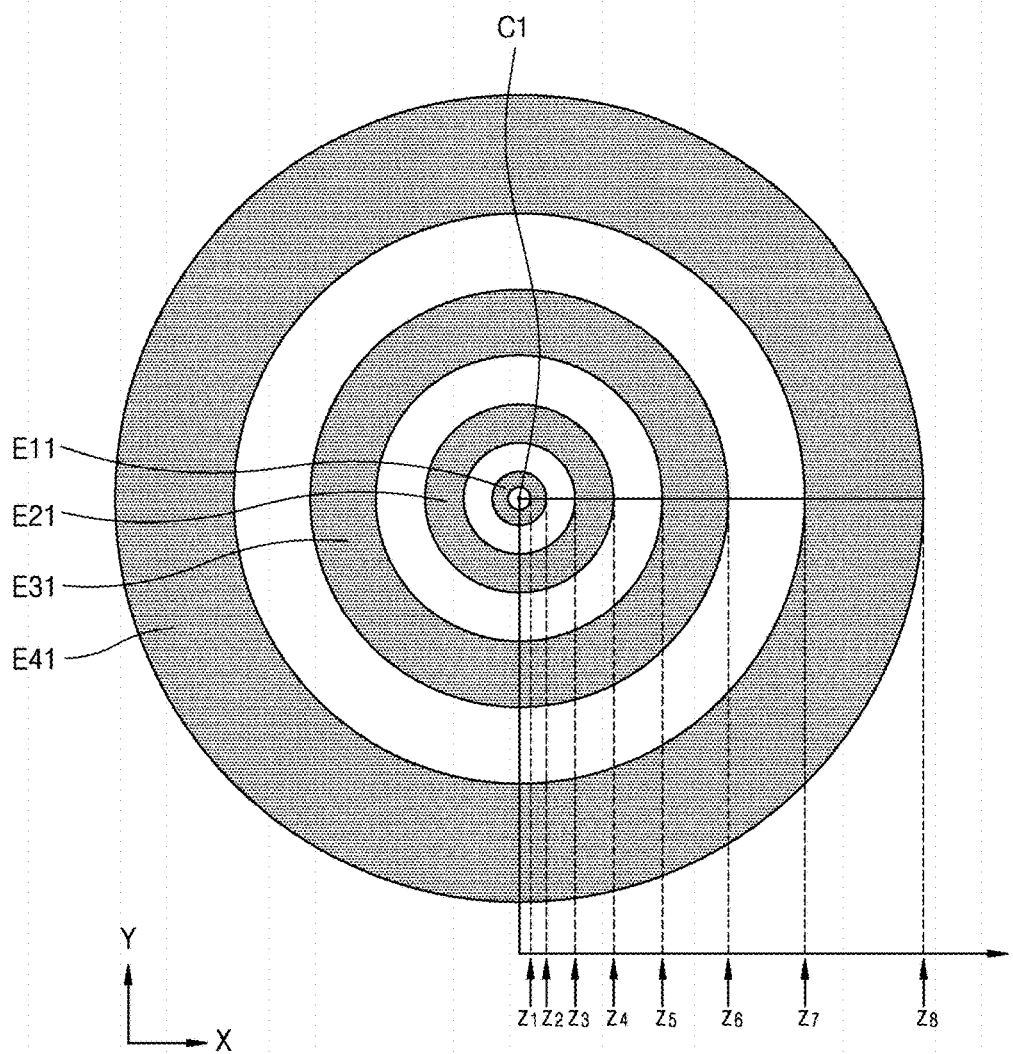
FIG. 12 is a plan view for explaining a design condition of an electromagnetic wave focusing device according to an exemplary embodiment.

In designing the electromagnetic wave focusing device according to an exemplary embodiment, the widths of and intervals between the material members forming a focusing apparatus may be determined by the following mathematical equations. The following mathematical equations are described with reference to FIG. 12. FIG. 12 illustrates that a plurality of material members E11, E21, E31, and E41, each having a ring shape, are arranged at different distances with respect to the reference point (center point) C1.

$$z_i = \frac{j_{1,i}^2}{Y} \qquad \text{[Mathematical Equation 1]}$$

$$Y = \frac{x_i^2}{z_1} \qquad \text{[Mathematical Equation 2]}$$

$$x_i = \sqrt{2\alpha_0 z_i \delta T} \qquad \text{[Mathematical Equation 3]}$$

In Mathematical Equation 1, "$z_i$" denotes a distance (width or interval) between an i-th surface and an (i−1)th surface (see FIG. 12). For example, "$z_1$" is a distance from an inner circumferential surface of the first material member E11 to the reference point (center point) C1, and "$z_2$" is a distance from the inner circumferential surface of the first material member E11 to an outer circumferential surface of the first material member E11. In Mathematical Equation 1, "$j_{1,i}$" denotes an i-th zero position of $J_1(x)$ which is a primary Bessel function. "Y" of Mathematical Equation 1 may be expressed by Mathematical Equation 2, and "$x_i$" of Mathematical Equation 2 is determined considering absorption properties and transmission properties of a medium (material member or space between material members), which may be expressed by Mathematical Equation 3. In Mathematical Equation 3, "$\alpha_0$" denotes an absorption coefficient of the medium (material member or space between material members), "$\delta$" denotes a half width at half maximum (HWHM) of an absorption spectrum of the medium, and "T" denotes a time during which light passes through the medium.

The widths and intervals of the material members forming the electromagnetic wave focusing device, e.g., $z_1$, $z_2$, $z_3$, $z_4$, $z_5$, $z_6$, $z_7$, and $z_8$ of FIG. 12, may be obtained by using Mathematical Equations 1 to 3. In some cases, after $z_1$ is set to an arbitrary value, the values of $z_2$, $z_3$, $z_4$, $z_5$, $z_6$, $z_7$, and $z_8$ may be obtained from the set value of $z_1$ by using Mathematical Equations 1 to 3. Alternatively, after $z_2$ is set to an arbitrary value, the values of $z_3$, $z_4$, $z_5$, $z_6$, $z_7$, and $z_8$ may be obtained from the set value of $z_2$ by using Mathematical Equations 1 to 3. However, the condition of Mathematical Equation 3 is merely exemplary, and Mathematical Equation 3 may vary according to a material, that is, a material of a medium, that is used. In other words, "$x_i$" of Mathematical Equation 3 may be a sort of a material coefficient, and the condition of Mathematical Equation 3 may be changed according to the type of a material. For example, the condition of Mathematical Equation 3 may vary according to whether dielectric or semiconductor is used as the medium or a combination of dielectric and semiconductor is used as the medium.

During interaction between the electromagnetic waves and the medium, absorption and/or emission of the electromagnet waves may occur on a surface/boundary of the medium (material members). An amplification phenomenon may be generated by an in-phase effect and a phase modulation effect at a surface of a particular material member or in an area adjacent thereto, due to coherent interaction of the absorption and/or emission. As a result, superior light focusing properties may be obtained. To this end, the widths and intervals of the material members forming the medium may be appropriately selected to satisfy the coherence condition with respect to the electromagnetic waves. According to the principle, an electromagnetic wave focusing device having a very small thickness and a small size (width) and also having superior light focusing properties may be manufactured.

The electromagnetic wave focusing device may be referred to as a focusing apparatus having a "spatially coherent structure (SCS)" or a "spatially coherent stack (SCS)" structure.

In the case of the existing Faraon-type metasurface, lens performance is implemented by arranging numerous amorphous silicon (a-Si) nanoposts on a substrate. Since an absorption coefficient of a nanopost is large in the visible light region, it is difficult to use the nanoposts in the visible light region. Also, since nanoposts having smaller sizes are necessary for use in in shorter wavelength regions, the processing difficulty is increased. In the case of a Pendry superlens, an image is formed in a point area by using a metamaterial having a negative (−) refractive index regardless of a diffraction limit. However, a complicated and difficult process is needed for manufacturing a Pendry superlens. Also, it is almost impossible to manufacture a metamaterial having a negative refractive index in various visible light wavelength regions, and there is a fundamental limitation such as light loss by metal. In the case of near-field scanning optical microscopy (NSOM), although resolution may be increased by using a near field of a metal tip, it is required that a distance between the metal tip and a sample is shorter than a wavelength. Accordingly, there is the difficulty that a user is required to have high-level proficient technique, expensive equipment is necessary, and coupling efficiency is low. In the case of stimulated emission depletion microscopy (STED), there is a limit of being a "functional" high-resolution technology using a fluorescent material.

According to various exemplary embodiments, an electromagnetic wave focusing device D10 having superior properties may be easily implemented by using a combination of simple patterns in a size within about 10 μm. The electromagnetic wave focusing device D10 may have a small thickness, for example, a thickness equal to or less than a subwavelength, and may be formed of a material having a relatively high absorption coefficient, such as, a-Si.

Since the electromagnetic wave focusing device D10 uses both the absorption and transmission of the electromagnetic waves, even when a material having a high absorption coefficient is employed, the electromagnetic wave focusing device D10 may exhibit a superior function as a light focusing component (lens). Also, since the width of material patterns forming the electromagnetic wave focusing device D10 is equal to or greater than about 50 nm or equal to or greater than about 100 nm, the electromagnetic wave focusing device D10 may be easily manufactured without processing difficulties. Also, the electromagnetic properties may be easily controlled by appropriately determining the width, interval, and thickness of the material patterns forming the electromagnetic wave focusing device D10. The electromagnetic wave focusing device D10 may be operable as a lens or a light focusing component from the visible ray region to an infrared ray (IR) region, or in some cases, even in a microwave region or an ultraviolet (UV) ray region. Also, since the electromagnetic wave focusing device D10 may be a non-metal structure without using metal, the light loss problem due to metal may not be generated.

When the electromagnetic wave focusing device D10 according to an exemplary embodiment is applied to a camera lens or a microscope lens, high resolving power/super-resolution imaging may be implemented. In the case of a microscope, since a non-fluorescence method using no fluorescent material is used, the microscope may correspond to "true" super-resolution technology. Also, since the interval between the electromagnetic wave focusing device D10 and an object (sample) to be observed is about several micrometers (μm) or more, high-level proficient technique is not required unlike the NSOM in manipulating the microscope adopting the electromagnetic wave focusing device D10 and the object (sample) damage problem may not be generated.

When the electromagnetic wave focusing device D10 according to an exemplary embodiment is used, a high resolving power/super-resolution microscope may be implemented overcoming the revolving power limit of the existing optical system. A high resolving power/super-resolution microscope having a resolving power equal to or less than ½ of the wavelength of the incident electromagnetic waves may be implemented. For example, the resolving power of the microscope may be equal to or less than about 200 nm or equal to or less than about 100 nm. The electromagnetic wave focusing device D10 may have an NA of about 0.3 or more. As the NA increases, resolution may be enhanced.

Figure 13:
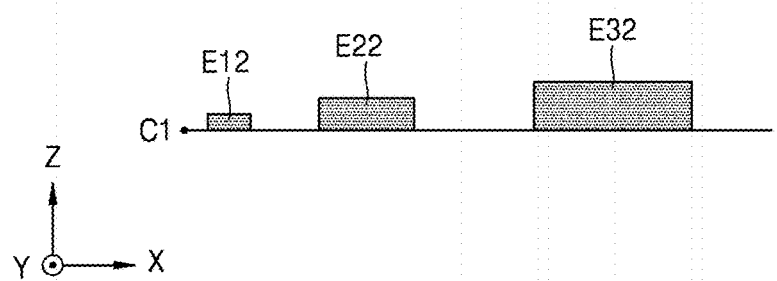
FIG. 13 is a cross-sectional view for explaining an electromagnetic wave focusing device according to another exemplary embodiment.

According to another exemplary embodiment, at least two of the material members forming the electromagnetic wave focusing device may have different thicknesses, an example of which is illustrated in FIG. 13.

FIG. 13 is a cross-sectional view for explaining an electromagnetic wave focusing device according to another exemplary embodiment. The position of a cross-section of FIG. 13 may correspond to that of the cross-section taken along a line A-A' of FIG. 1. This is also the case with respect to FIGS. 14 and 15.

Referring to FIG. 13, a plurality of material members E12, E22, and E32 may be provided around the reference point C1. The widths and intervals of the material members E12, E22, and E32 may vary with distance from the reference point C1. At least two of the material members E12, E22, and E32 may have different thicknesses. For example, the thicknesses of the material members E12, E22, and E32 may increase with distance from the reference point C1. In this case, the thickness of the second material member E22 may be greater than the thickness of the first material member E12, and the thickness of the third material member E32 may be greater than the thickness of the second material member E22. As such, a focusing effect of the electromagnetic waves may be further reinforced by appropriately determining not only the widths and intervals of the material members E12, E22, and E32, but also the thicknesses of the material members E12, E22, and E32.

Figure 14:
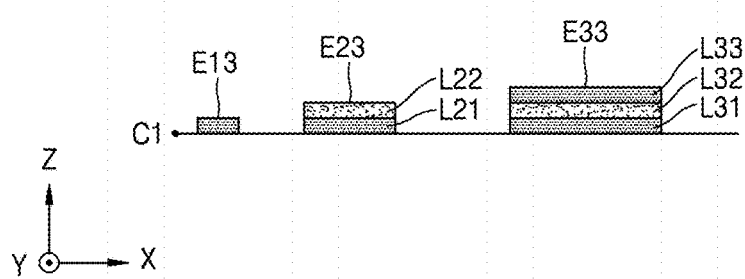
FIG. 14 is a cross-sectional view for explaining an electromagnetic wave focusing device according to another exemplary embodiment.

Although FIG. 13 illustrates a case in which all of the material members E12, E22, and E32 having different thicknesses are in a single layer structure, according to another exemplary embodiment, at least one of the material members E12, E22, and E32 may have a multilayer structure, and at least two of the material members E12, E22, and E32 may have different numbers of layers, an example of which is illustrated in FIG. 14.

FIG. 14 is a cross-sectional view for explaining an electromagnetic wave focusing device according to another exemplary embodiment. Referring to FIG. 14, at least one of a plurality of material members E13, E23, and E33 may have a multilayer structure, and at least two of the material members E13, E23, and E33 may have different numbers of layers. For example, the first material member E13 may have a single layer structure, the second material member E23 may have a double layer structure, and the third material member E33 may have a triple layer structure. In this state, two layers L21 and L22 forming the second material member E23 may be formed of different materials or the same material. Also, at least two of three layers L31, L32, and L33 forming the third material member E33 may be formed of different materials or the same material. The E13, L21, and L31 may be formed of a first material, the L22 and L32 may be formed of a second material that is different from the first material, and the L33 may be formed of a third material that is different from the first and second materials, or formed of the first material. As such, the focusing effect of electromagnetic waves may be controlled by appropriately determining the number of material layers and materials of at least two of the material members E13, E23, and E33.

Although FIGS. 13 and 14 illustrate cases in which the thicknesses of the material members E12, E22, and E32/E13, E23, and E33 increase with distance from the reference point C1, this is merely exemplary and the thicknesses of the material members E12, E22, and E32/E13, E23, and E33 may be variously determined. For example, the thicknesses of the material members may decrease with distance from the reference point C1, an example of which is illustrated in FIG. 15.

Figure 15:
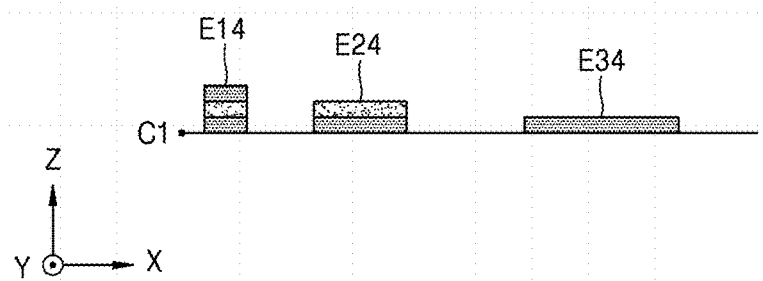
FIG. 15 is a cross-sectional view for explaining an electromagnetic wave focusing device according to another exemplary embodiment.

FIG. 15 is a cross-sectional view for explaining an electromagnetic wave focusing device according to another exemplary embodiment. Referring to FIG. 15, the thicknesses of a plurality of material members E14, E24, and E34 may decrease with distance from the reference point C1. Also, as necessary, at least two of the material members E14, E24, and E34 may have material layers forming each of the material members E14, E24, and E34, the number of the material layers being different from each other. For example, the first material member E14 may have a triple layer structure, the second material member E24 may have a double layer structure, and the third material member E33 may have a single layer structure.

Although not illustrated, the thicknesses of material members may increase and then decrease, or may decrease and then increase, with distance from the reference point (center point) C1. Also, the material members may have random thicknesses.

Although, in the above-described exemplary embodiments, the material members forming the electromagnetic wave focusing device each have a ring shape, the material members may have a shape other than a ring shape. While a ring structure completely surrounds the reference point (center point), another structure other than a ring structure may have only partially surround the reference point (center point). Cases in which the material members have structures other ring structures is illustrated in FIGS. 16 to 19.

Figure 16:
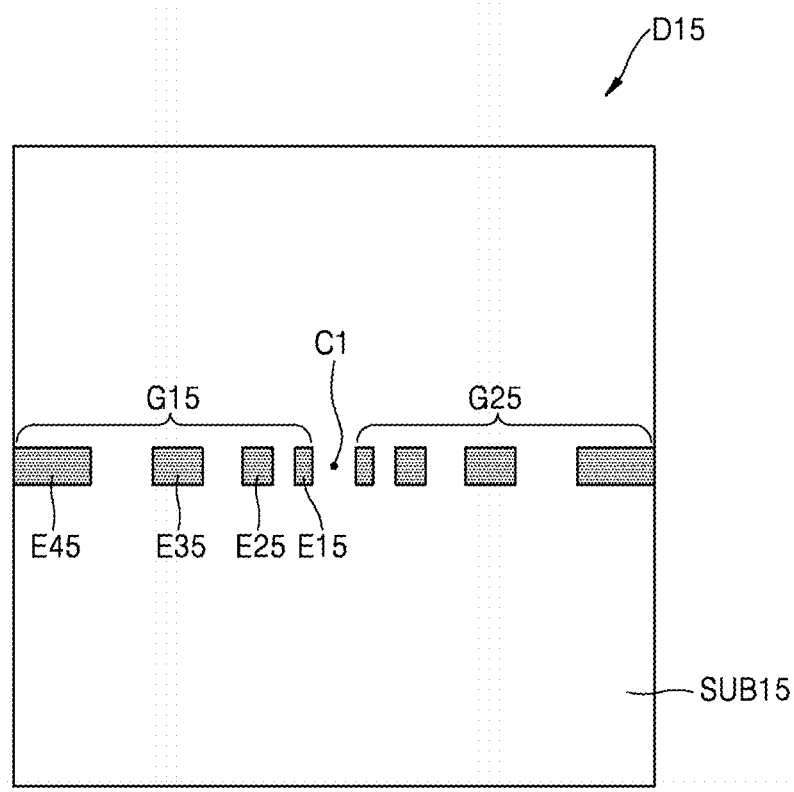
FIG. 16 is a plan view of an electromagnetic wave focusing device according to another exemplary embodiment.

FIG. 16 is a plan view of an electromagnetic wave focusing device D15 according to another exemplary embodiment.

Referring to FIG. 16, the electromagnetic wave focusing device D15 may include a first focusing unit G15 provided on a surface of a substrate SUB15. The first focusing unit G15 may include a plurality of material members E15 to E45 arranged such that each material member is respectively farther from the reference point C1. The intervals and/or widths of the material members E15 to E45 may vary (increase/decrease) with distance from the reference point C1. Each of the material members E15 to E45 may have a rectangular shape. For example, the material members E15 to E45 may have a rectangular or square shape.

The electromagnetic wave focusing device D15 may further include a second focusing unit G25. The second focusing unit G25 may have a structure that is the same or similar to that of the first focusing unit G15. For example, the second focusing unit G25 and the first focusing unit G15 may have symmetrical structures with respect to the reference point C1.

As such, even when the material members E15 to E45 of the electromagnetic wave focusing device D15 have a structure (rectangular structure) other than the ring shape, the electromagnetic waves may be focused and output by the material members E15 to E45 at the reference point C1 or in the vicinity thereof.

In the structure of FIG. 16, a width of the substrate SUB15 in a Y-axis direction may be reduced. In other words, the size of the electromagnetic wave focusing device D15 may be reduced. Also, if desired, one or more other devices (not shown) may be further provided on the substrate SUB15 at one or both sides of the focusing units G15 and G25.

Figure 17:
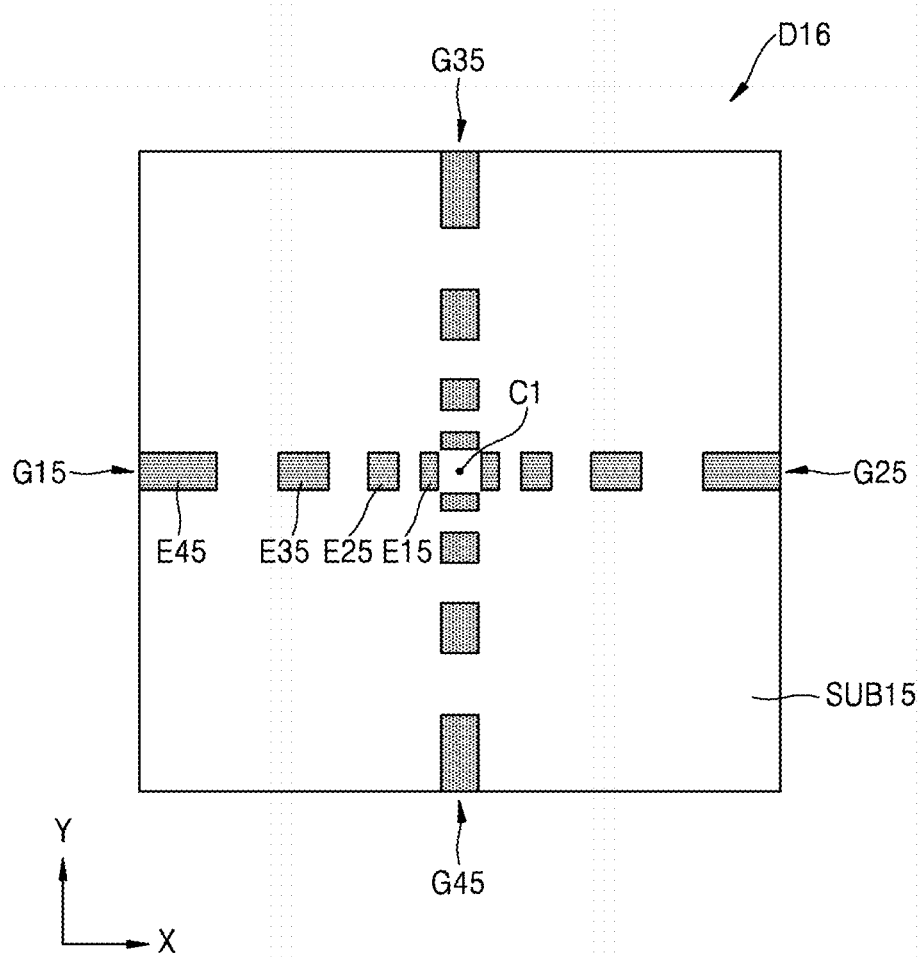
FIG. 17 is a plan view of an electromagnetic wave focusing device according to another exemplary embodiment.

Although FIG. 16 illustrates a case in which the first and second focusing units G15 and G25 are horizontally and symmetrically arranged with respect to the reference point C1, according to another exemplary embodiment, the focusing units may be arranged in four directions with respect to the reference point C1, an example of which is illustrated in FIG. 17.

Referring to FIG. 17, an electromagnetic wave focusing device D16 may include the first and second focusing units G15 and G25 horizontally arranged in an X-axis direction with respect to the reference point C1, and further include third and fourth focusing units G35 and G45 horizontally arranged in a Y-axis direction. The first to fourth focusing units G15 to G45 may have substantially the same structure, except for the arrangement direction of the material members E15 to E45. Compared to the structure of FIG. 16, when the number of the focusing units is increased as illustrated in FIG. 17, a focusing effect of the electromagnetic waves may be increased.

Figure 18:
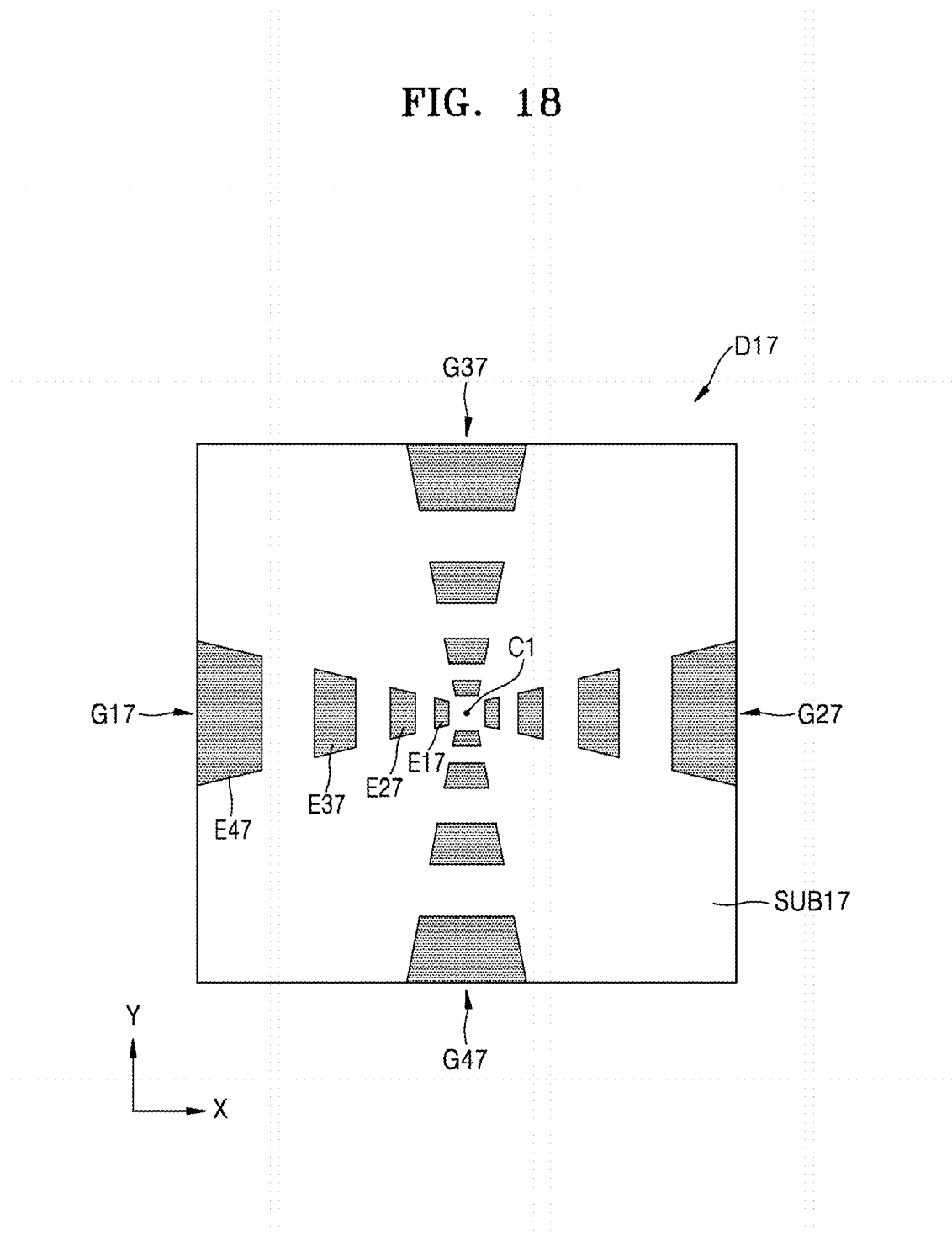
FIG. 18 is a plan view of an electromagnetic wave focusing device according to another exemplary embodiment.

In the structures of FIGS. 16 and 17, the lengths of the material members E15 to E45 forming the focusing units G15 to G45 may vary, an example of which is illustrated in FIG. 18.

Referring to FIG. 18, a first focusing unit G17 may include a plurality of material members E17 to E47 sequentially arranged with distance from the reference point C1. The lengths of the material members E17 to E47 may increase with distance from the reference point C1. Accordingly, the first focusing unit G17 may have a structure tapered toward the reference point C1. The second to fourth focusing units G27, G37, and G47 may have the structure tapered toward the reference point C1, similar to the structure of the first focusing unit G17. As such, when the focusing units G17 to G47 has the structure tapered toward the reference point C1, the focusing effect of the electromagnetic waves may be further improved. In FIG. 18, SUB18 and D17 respectively denote a substrate and an electromagnetic wave focusing device.

Figure 19:
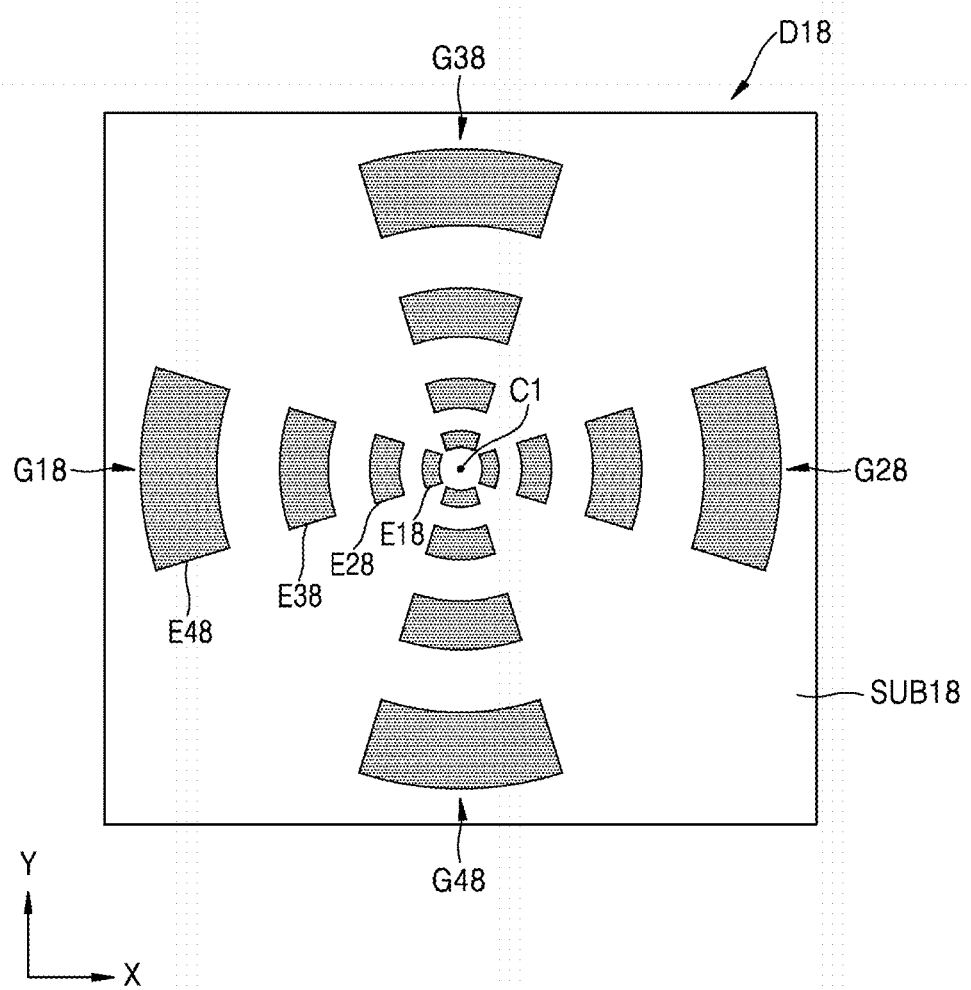
FIG. 19 is a plan view of an electromagnetic wave focusing device according to another exemplary embodiment.

Each of the material members E17 to E47 of FIG. 18 may be modified to have a curved shape, not a straight shape, an example of which is illustrated in FIG. 19.

Referring to FIG. 19, a first focusing unit G18 may have a plurality of material members E18 to E48. The material members E18 to E48 may have a concavely circular arc shape with respect to the reference point C1 or a similar shape thereto. The sizes of the material members E18 to E48 may increase with distance from the reference point C1. Second to fourth focusing units G28, G38, and G48 having the same structure as that of the first focusing unit G18 but a different arrangement direction from that of the first focusing unit G18 may be further provided. As such, when the material members E18 to E48 have a circular arc shape or a similar shape thereto, the focusing effect of the electromagnetic waves may be further improved.

Although FIGS. 16 to 19 illustrate cases in which the focusing units, e.g., G15 and G25 of FIG. 16, are symmetrically arranged with respect to the reference point C1, according to another exemplary embodiment, asymmetrical structure may be possible. For example, in FIG. 16, one of the first and second focusing units G15 and G25 may be excluded, and in FIGS. 17 to 19, one to three focusing units of the first to fourth focusing units, e.g., G15 to G45 of FIG. 17, may be excluded. Also, although FIGS. 16 to 19 illustrate a case of using two to four focusing units, the electromagnetic wave focusing device may be formed by using three to five focusing units.

Figure 20:
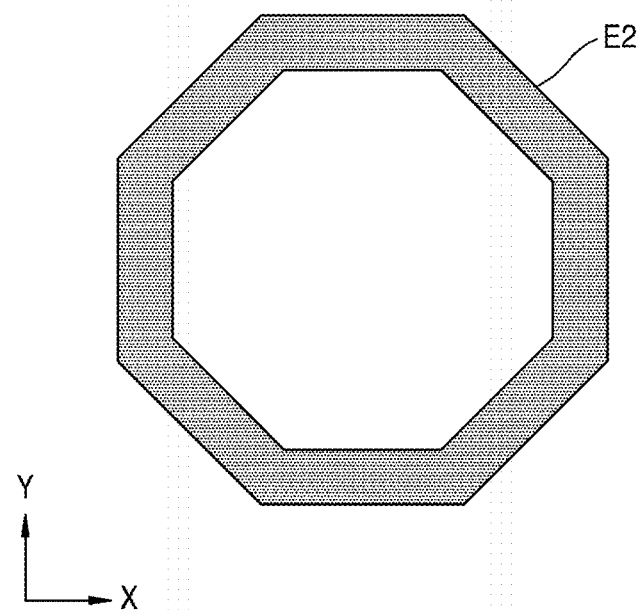
FIG. 20 is a plan view for explaining an electromagnetic wave focusing device according to another exemplary embodiment.

According to another exemplary embodiment, the material members forming the electromagnetic wave focusing device may have a structure different from the ring stricture while encompassing the reference point (center point), examples of which are illustrated in FIGS. 20 and 21.

Referring to FIG. 20, a material member E2 may have an octagonal ring structure.

Referring to FIG. 21, a material member E3 may have a rectangular ring structure.

Although FIGS. 20 and 21 illustrate the single material members E2 and E3, as described above in FIGS. 1 and 2, a plurality of material members having different sizes may be arranged at different distances with respect to the reference point C1, and the intervals and/or widths of the material members may vary with distance from the reference point C1. In addition to the modified shapes as illustrated in FIGS. 20 and 21, the shape of the material member may be variously changed.

Figure 22:
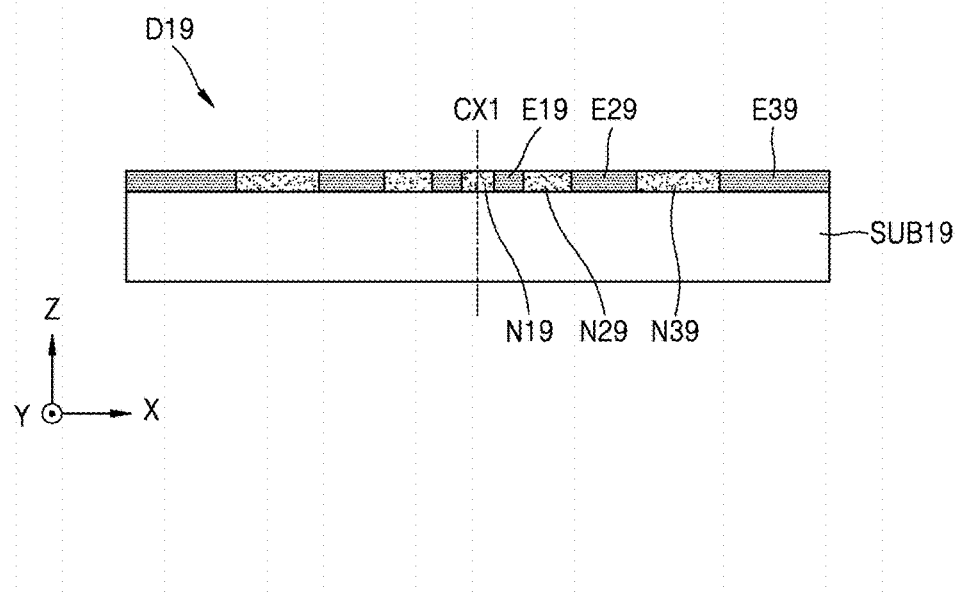
FIG. 22 is a cross-sectional view of a structure of an electromagnetic wave focusing device according to another exemplary embodiment.

FIG. 22 is a cross-sectional view of a structure of an electromagnetic wave focusing device D19 according to another exemplary embodiment.

Referring to FIG. 22, the electromagnetic wave focusing device D19 may include a plurality of material members E19, E29, and E39 provided on one surface of a substrate SUB19. The material members E19, E29, and E39 may be sequentially arranged with distance from an imaginary reference axis CX1. The intervals and/or widths of the material members E19, E29, and E39 may vary with distance from the reference axis CX1. The electromagnetic wave focusing device D19 may further include a plurality of the intermediate material members N19, N29, and N39 filling spaces between the material members E19, E29, and E39. The intermediate material members N19, N29, and N39 may be formed of a material having a refractive index different from that of the material of the material members E19, E29, and E39. When the material members E19, E29, and E39 is formed of a first material, the intermediate material members N19, N29, and N39 may be formed of a second material that is different from the first material. Among the intermediate material members N19, N29, and N39, the first intermediate material member N19 corresponding to the reference axis CX1 may have a circular (disk) shape, not a ring shape, when viewed from the above. The other intermediate material members N29 and N39 may have a ring shape or a similar shape thereto. The material members E19, E29, and E39 may have a ring shape or a similar shape thereto.

As illustrated in FIG. 22, when the intermediate material members N19, N29, and N39 are provided between the material members E19, E29, and E39, a design rule for focusing the electromagnetic waves may be determined by the above-described Mathematical Equations 1 to 3.

Figure 23:
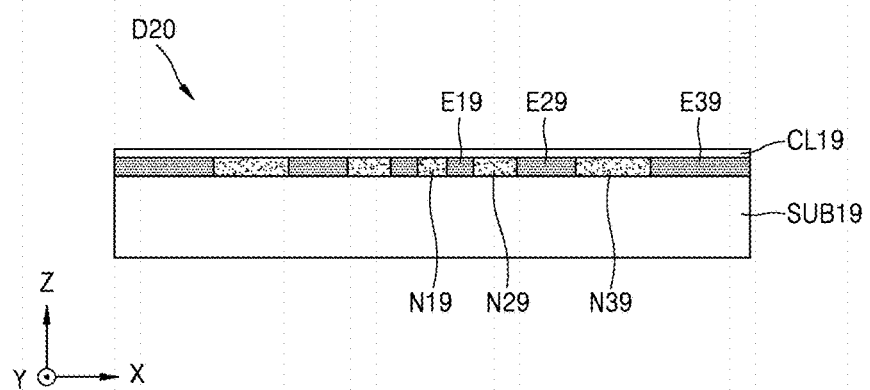
FIG. 23 is a cross-sectional view of a structure of an electromagnetic wave focusing device according to another exemplary embodiment.

According to another exemplary embodiment, a cover layer may be further included in the structure of FIG. 22, an example of which is illustrated in FIG. 23.

Referring to FIG. 23, an electromagnetic wave focusing device D20 may further include a cover layer CL19 covering the material members E19, E29, and E39, and the intermediate material members N19, N29, and N39. The cover layer CL19 may be formed of a dielectric material or a semiconductor material. The cover layer CL19 may have a small thickness. For example, the cover layer CL19 may have a thickness of equal to or less than about 10 nm or equal to or less than about 5 nm. When the cover layer CL19 has a small thickness, the cover layer CL19 may not interfere with focusing of electromagnetic waves at the opposite side of the substrate SUB19, the electromagnetic waves being input from one side of the substrate SUB19 and passing through the material members E19, E29, and E39. The cover layer CL19 may protect the material members E19, E29, and E39, and the intermediate material members N19, N29, and N39.

Figure 24:
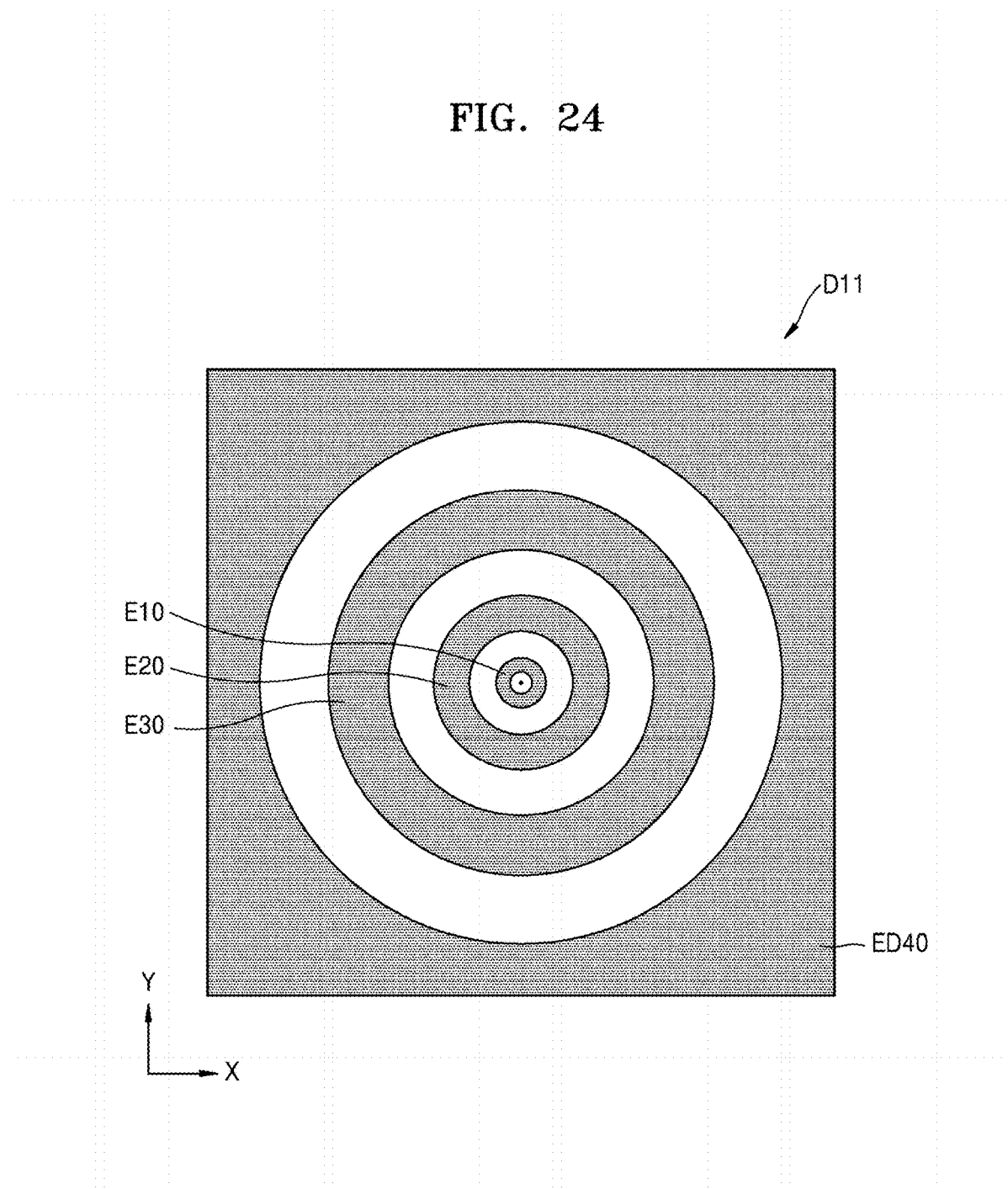
FIG. 24 is a plan view of an electromagnetic wave focusing device according to another exemplary embodiment.

FIG. 24 is a plan view of an electromagnetic wave focusing device D1$l$ according to another exemplary embodiment.

Referring to FIG. 24, the electromagnetic wave focusing device D1$l$ may include the material members E10, E20, and E30 having a ring shape and provided on a substrate (not shown), and may further include a dummy pattern ED40 outside the material members E10, E20, and E30, surrounding the material members E10, E20, and E30. The material members E10, E20, and E30 may have a circular ring shape, whereas the dummy pattern ED40 may have a circular inner circumference and a rectangular outer circumference. The dummy pattern ED40 may be formed of the same material as that of the material members E10, E20, and E30. The interval between the dummy pattern ED40 and the third material member E30 may be greater than the interval between the second material member E20 and the third material member E30. Also, the interval between the dummy pattern ED40 and the third material member E30 may be greater than the width (distance between an inner side and an outer side) of the third material member E30. The dummy pattern ED40 may not affect or may substantially not affect the focusing of electromagnetic waves. However in some cases, a part of the dummy pattern ED40 may somewhat affect the focusing of electromagnetic waves.

Figure 25:
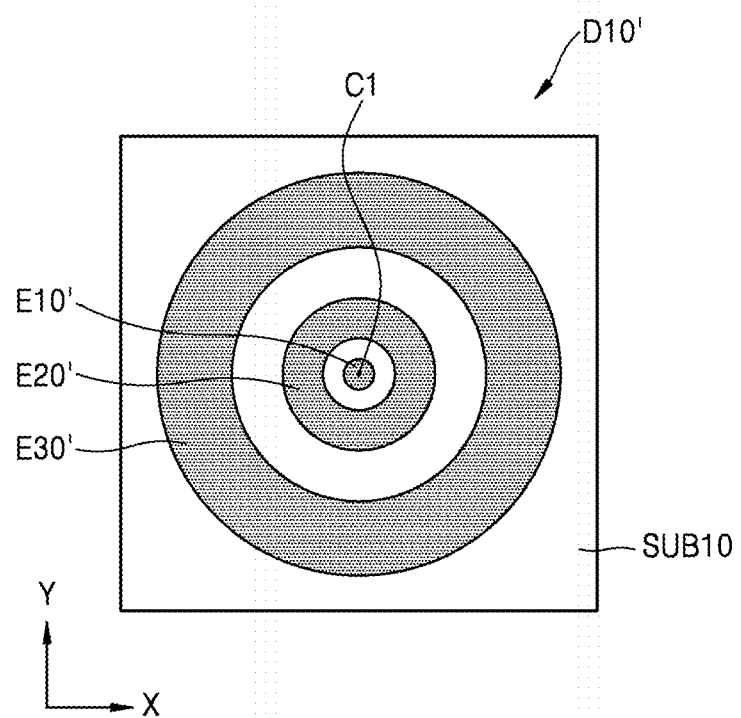
FIG. 25 is a plan view of an electromagnetic wave focusing device according to another exemplary embodiment.

FIG. 25 is a plan view of an electromagnetic wave focusing device D10' according to another exemplary embodiment.

Referring to FIG. 25, the electromagnetic wave focusing device D10' may include a plurality of material members E10', E20', and E30' provided on the substrate SUB10. The material members E10', E20', and E30' may include, for example, the first material member E10', the second material member E20', and the third material member E30'. The first material member E10' may have a circular structure covering the reference point (center point) C1. The second material member E20' and the third material member E30' may each have a ring structure. When the electromagnetic wave focusing device D10 of FIG. 1 has a structure with an empty center, the electromagnetic wave focusing device D10' of FIG. 25 may have a structure with a filled center. As such, the focusing effect of electromagnetic waves may be obtained in the structure with a filled center.

Figure 26:
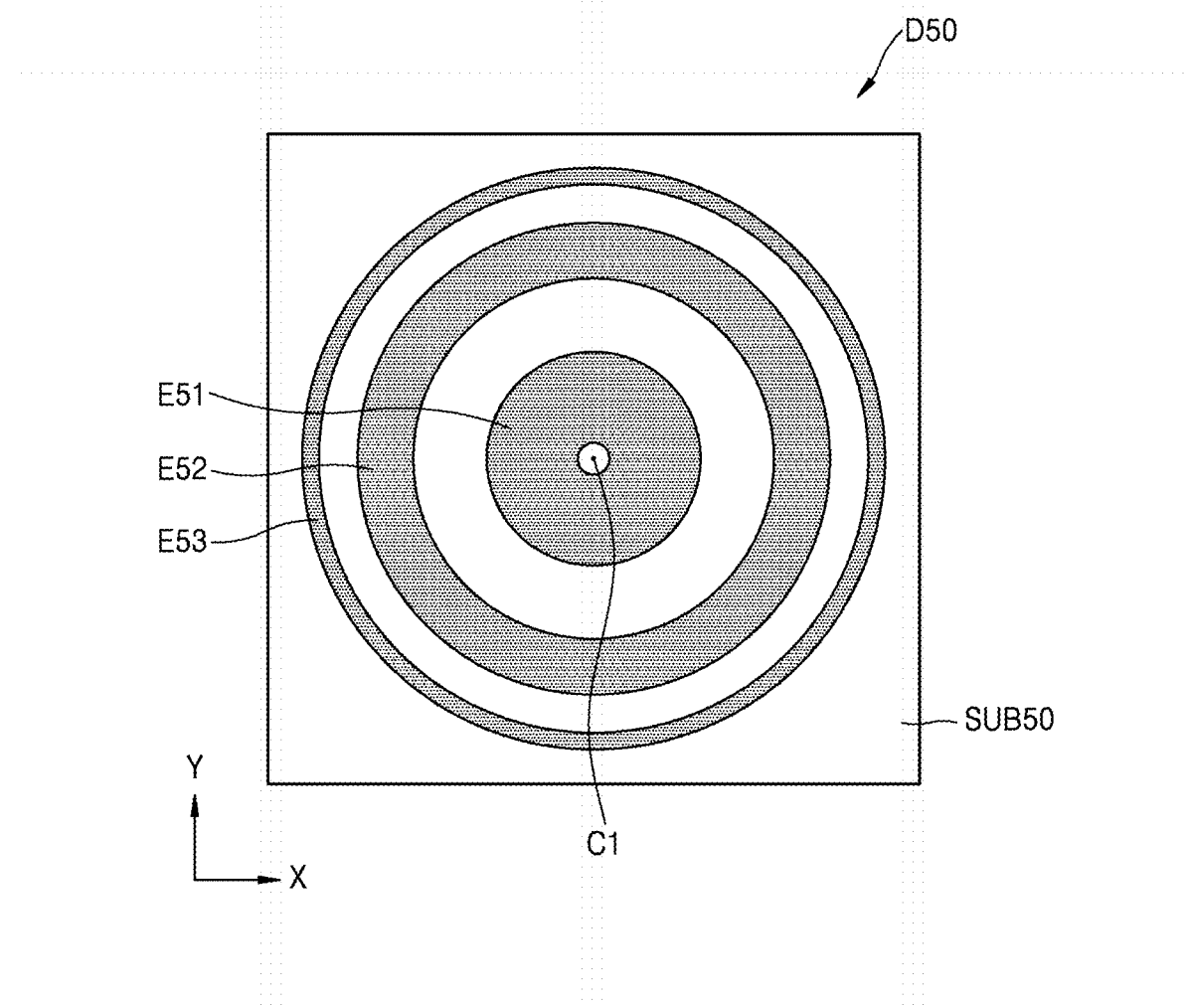
FIG. 26 is a plan view of an electromagnetic wave focusing device according to another exemplary embodiment.

FIG. 26 is a plan view of an electromagnetic wave focusing device D50 according to another exemplary embodiment.

Referring to FIG. 26, the electromagnetic wave focusing device D50 may include a plurality of material members E51, E52, E53 provided on a substrate SUB50. The material members E51, E52, and E53 may be sequentially arranged in a direction in which each component is farther from the reference point C1. The widths and/or intervals of the material members E51, E52, and E53 may decrease with distance from the reference point C1. For example, the widths and intervals of the material members E51, E52, and E53 may sequentially decrease with distance from the reference point C1.

The electromagnetic wave focusing devices according to above-described exemplary embodiments may be applied to various optical apparatuses for various purposes. For example, the electromagnetic wave focusing devices may be applied to various imaging apparatuses including microscopes. When the electromagnetic wave focusing device is applied to a lens unit of a microscope, a high resolving power/super-resolution microscope may be implemented. Also, the electromagnetic wave focusing device may be applied to an internet of things (IoT) device on which an integrated photonic chip (IPC) based on silicon or non-silicon is mounted. Also, the electromagnetic wave focusing device, which is mounted on mobile phones or next generation flexible displays, may be applied to cameras or various devices performing mobile healthcare functions. In addition, the electromagnetic wave focusing device may be applied to various optical apparatuses and electronic apparatuses. Also, the structures according to the embodiments (that is, the electromagnetic wave focusing devices) may be applied to various fields using a beam focusing or collimating function, for example, camera lenses, optical zoom lenses, or image sensors of smartphones or wearable devices. In the case of the zoom lens, using a plurality of structures (that is, electromagnetic wave focusing devices) by connecting/arranging the same may be taken into consideration.

Figure 27:
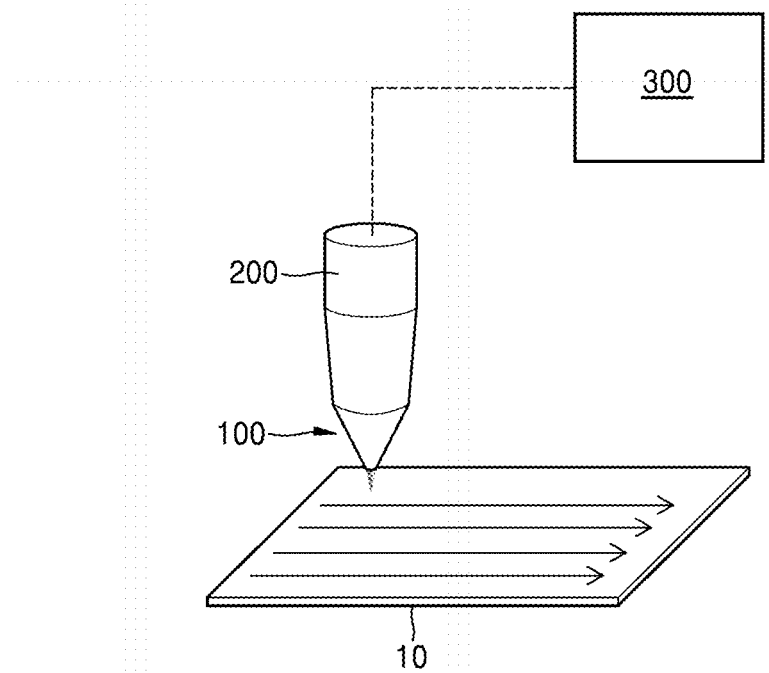
FIG. 27 illustrates an optical apparatus (microscope) employing an electromagnetic wave focusing device according to an exemplary embodiment.

FIG. 27 illustrates an optical apparatus (microscope) employing an electromagnetic wave focusing device according to an exemplary embodiment.

Referring to FIG. 27, an objective lens unit 100 may be disposed facing an object 10 to be observed. The objective lens unit 100 may include one of the electromagnetic wave focusing devices according to one or more of the above-described exemplary embodiments. The objective lens unit 100 may be provided with an electromagnetic waves source unit 200 that irradiates electromagnetic waves. The electromagnetic waves source unit 200 may be referred to the "light source unit". The electromagnetic waves generated by the electromagnetic waves source unit 200 may have a wavelength in a visible light region or an IR region, or in some cases, a wavelength in a microwave region or a UV region. The electromagnetic waves (light) generated by the electromagnetic waves source unit 200 may be focused by the electromagnetic wave focusing device of the objective lens unit 100 and irradiated onto the object 10.

The optical apparatus (microscope) according to the present exemplary embodiment may further include an image providing unit 300 that shows an image of the object 10 obtained through the objective lens unit 100. The image providing unit 300 may include, for example, a display device. The image providing unit 300 may be electrically connected to the objective lens unit 100. Also, the image providing unit 300 may be connected to the objective lens unit 100 in wireless communications.

The optical apparatus (microscope) may have a high resolving power/super-resolution by the electromagnetic wave focusing device used in the objective lens unit 100. In detail, the optical apparatus (microscope) may have a resolving power less than ½ of the wavelength of the electromagnetic waves incident upon the electromagnetic wave focusing device.

The optical apparatus (microscope) may be configured to obtain an image in a method of scanning the object 10. In this state, the objective lens unit 100 may scan the object 10 at an interval spaced apart from the object 10 by several micrometers or more. Also, the optical apparatus (microscope) may obtain an image in a non-fluorescent method using no fluorescent material.

Although not illustrated in FIG. 27, the optical apparatus (microscope) may further include at least one of various elements such as a controller, an operating unit, a data processor, a communicator, a user interface, a memory etc. The optical apparatus may include a memory storing software instructions thereon and a processor which executes the software stored in the memory.

In the case of the NSOM, although resolution may be increased by using a near field of a metal tip, it is required that a distance between the metal tip and a sample is shorter than a wavelength. Accordingly, there is the difficulty that a user is required to have high-level proficient technique, expensive equipment is necessary, and coupling efficiency is low. In the case of the STED, there is a limit of being a "functional" high-resolution technology using a fluorescent material In the case of the microscope according to an exemplary embodiment, since a non-fluorescence method using no fluorescent material is used, the microscope may correspond to "true" super-resolution technology. Also, since the interval between the electromagnetic wave focusing device (that is, lens unit) and the object 10 to be observed is about several micrometers (μm) or more, high-level proficient technique is not required unlike the NSOM in manipulating the microscope adopting the electromagnetic wave focusing device and the object (sample) damage problem may not be generated. When the electromagnetic wave focusing device according to an exemplary embodiment is used, a high resolving power/super-resolution microscope may be implemented overcoming the revolving power limit of the existing optical system. A high resolving power/super-resolution microscope having a resolving power equal to or less than ½ of the wavelength of the incident electromagnetic waves may be implemented. For example, the resolving power of the microscope may be equal to or less than about 200 nm or equal to or less than about 100 nm.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. For example, it may be seen that the structures of the electromagnetic wave focusing devices described with reference to FIGS. 1 to 3, and FIGS. 12 to 26, may be variously modified. In a detailed example, it may be seen that the intervals and/or widths of the material members forming the electromagnetic wave focusing device may be randomly changed as each material member is farther from the reference point and the shapes of the material members may be variously changed. Also, it may be seen that the structure of the optical apparatus described with reference to FIG. 27 may be variously changed, and the field of the optical apparatus to which the electromagnetic wave focusing device is applied may be variously changed. While one or more embodiments have been described with reference to the figures, it will be understood by those of ordinary skill in the art that various changes in form and details may be made therein without departing from the spirit and scope as defined by the following claims.

What is claimed is:

1. An electromagnetic wave focusing device comprising:
a plurality of material members, wherein each of the plurality of material members at least partially surrounds a reference point and is located at a distance from the reference point different from distances at which all other of the plurality of material members are located,
wherein the plurality of material members are arranged at non-uniform intervals,
wherein the plurality of material members focus electromagnetic waves incident thereon and transmitted therethrough at a point in space,
wherein each of the plurality of material members has a ring shape, and
wherein the plurality of material members are arranged at different distances with respect to the reference point and satisfy:

$$z_i = \frac{j_{1,i}^2}{Y} \text{ and}$$
$$Y = \frac{x_i^2}{z_1}$$

wherein $z_i$ is a distance between an i-th surface and an (i−1)th surface of the material members, $j_{1,i}$ is an i-th zero position of $J_1(x)$ which is a primary Bessel function, and $x_i$ is a material coefficient determined based on absorption and transmission properties of a medium, wherein the medium is a material member or a space between material members.

2. The electromagnetic wave focusing device of claim 1, wherein a first pair of adjacent material members of the plurality of material members are disposed with a first interval therebetween;
wherein a second pair of adjacent material members of the plurality of material members are disposed with a second interval therebetween, wherein the second interval is different from the first interval.

3. The electromagnetic wave focusing device of claim 1, wherein the intervals increase with distance from the reference point.

4. The electromagnetic wave focusing device of claim 1, wherein the intervals decrease with distance from the reference point.

5. The electromagnetic wave focusing device of claim 1, wherein, for each of the plurality of material members, a width is defined as a distance between an inner circumference and an outer circumference, and at least a first width of a first one of the plurality of material members is different from a second width of a second one of the plurality of material members.

6. The electromagnetic wave focusing device of claim 5, wherein widths of the plurality of material members vary with distance from the reference point.

7. The electromagnetic wave focusing device of claim 5, wherein the intervals and widths of the plurality of material members sequentially increase or decrease with distance from the reference point.

8. The electromagnetic wave focusing device of claim 1, wherein each of the plurality of material members comprises one of a dielectric material and a semiconductor material.

9. The electromagnetic wave focusing device of claim 1, wherein each of the plurality of material members comprises one of Si, Ge, GaP, SiOx, SiNx, and an oxide semiconductor, and
the oxide semiconductor comprises at least one of Zn, In, Ga, and Sn.

10. The electromagnetic wave focusing device of claim 1, wherein a first thickness of a first one of the plurality of material members is different from a second thickness of a second one of the plurality of material members.

11. The electromagnetic wave focusing device of claim 1, wherein the plurality of material members comprises a first material member and a second material member,
at least the first material member has a multilayer structure, and
a number of material layers constituting the first material member is different from a number of material layers constituting the second material member.

12. The electromagnetic wave focusing device of claim 1, wherein thicknesses of the plurality of material members range from several tens of nanometers (nm) to several micrometers (μm).

13. The electromagnetic wave focusing device of claim 1, wherein an entire width of the plurality of material members ranges from about 0.5 μm to about 50 μm.

14. The electromagnetic wave focusing device of claim 1, wherein a numerical aperture (NA) of the electromagnetic wave focusing device is equal to or greater than 0.3.

15. The electromagnetic wave focusing device of claim 1, wherein the electromagnetic wave focusing device is configured to output an output light having a full width at half maximum (FWHM) that is less than ½ of a wavelength of an incident light.

16. The electromagnetic wave focusing device of claim 1, further comprising a transparent substrate,
wherein the plurality of material members are provided on a surface of the transparent substrate.

17. An optical apparatus comprising the electromagnetic wave focusing device of claim 1.

18. A microscope comprising:
an objective lens unit arranged facing an object to be observed, the objective lens unit comprising the electromagnetic wave focusing device of claim 1;

an electromagnetic wave source unit configured to irradiate electromagnetic waves toward the objective lens unit; and an image providing unit configured to display an image of the object obtained through the objective lens unit.

19. The microscope of claim 18, having a resolving power that is less than ½ of a wavelength of the electromagnetic waves incident upon the electromagnetic wave focusing device.

20. The microscope of claim 18, being configured to obtain an image of the object by scanning the object.

21. The electromagnetic wave focusing device of claim 1, wherein:

$$x_i = \sqrt{2\alpha_0 z_i \delta T},$$

wherein $\beta_0$ is an absorption coefficient of the medium, $\delta$ is a half width at half maximum of an absorption spectrum of the medium, and T is a time during which light passes through the medium.

22. An electromagnetic wave focusing device for focusing electromagnetic waves at a point in space, the electromagnetic wave focusing device comprising:
a plurality of material members, wherein each of the plurality of material members at least partially surrounds a reference point and is located at a distance from the reference point different from distances at which all other of the plurality of material members are located,
wherein intervals and widths of the plurality of material members vary to satisfy spatial coherence with the electromagnetic waves with distance from the reference point, and the widths are defined as a distance between an outer circumference and an inner circumference of each of the plurality of material members,
wherein each of the plurality of material members has a ring shape, and
wherein the plurality of material members are arranged at different distances with respect to the reference point and satisfy:

$$z_i = \frac{j_{1,i}^2}{Y} \text{ and}$$

$$Y = \frac{x_i^2}{z_1}$$

wherein $z_i$, is a distance between an i-th surface and an (i−1)th surface of the material members, $j_{1,i}$ is an i-th zero position of $J_1(x)$ which is a primary Bessel function, and x, is a material coefficient determined based on absorption and transmission properties of a medium, wherein the medium is a material member or a space between material members.

23. The electromagnetic wave focusing device of claim 22, wherein the intervals and widths of the plurality of material members increase with distance from the reference point.

24. The electromagnetic wave focusing device of claim 22, wherein the intervals and widths of the plurality of material members decrease with distance from the reference point.

25. An optical apparatus comprising the electromagnetic wave focusing device of claim 22.

* * * * *